(12) United States Patent
Guan et al.

(10) Patent No.: US 6,810,376 B1
(45) Date of Patent: Oct. 26, 2004

(54) SYSTEM AND METHODS FOR DETERMINING SEMANTIC SIMILARITY OF SENTENCES

(75) Inventors: Yi Guan, Clear Water Bay (HK); Pascale Fung, Clear Water Bay (HK)

(73) Assignee: Nusuara Technologies SDN BHD (MY)

(*) Notice: Subject to any disclaimer, the term of this patent is extended or adjusted under 35 U.S.C. 154(b) by 269 days.

(21) Appl. No.: 09/614,465

(22) Filed: Jul. 11, 2000

(51) Int. Cl.[7] .................................................. G06F 17/27
(52) U.S. Cl. ...................................................... 704/9
(58) Field of Search ...................... 704/9, 10; 395/2.66; 707/2–6, 101; 364/419.13; 715/530, 531

(56) References Cited

U.S. PATENT DOCUMENTS

| | | | | |
|---|---|---|---|---|
| 5,297,039 A | * | 3/1994 | Kanaegami et al. | 707/5 |
| 5,619,709 A | * | 4/1997 | Caid et al. | 715/532 |
| 5,675,819 A | * | 10/1997 | Schuetze | 704/10 |
| 5,680,511 A | * | 10/1997 | Baker et al. | 704/257 |
| 5,873,056 A | * | 2/1999 | Liddy et al. | 704/9 |
| 6,137,911 A | * | 10/2000 | Zhilyaev | 382/225 |
| 6,260,008 B1 | * | 7/2001 | Sanfilippo | 704/9 |
| 6,453,315 B1 | * | 9/2002 | Weissman et al. | 707/5 |

* cited by examiner

Primary Examiner—Patrick N. Edouard
(74) Attorney, Agent, or Firm—Kevin A. Oliver; Foley Hoag LLP

(57) ABSTRACT

A system and associated methods determine the semantic similarity of different sentences to one another. A particularly appropriate application of the present invention is to automatic processing of Chinese-language text, for example, for document retrieval. A method for computing the similarity between a first and a second set of words comprises identifying a word of the second set of words as being most similar to a word of the first set of words, wherein the word of the second set of words need not be identical to the word of the first set of words; and computing a score of the similarity between the first and second set of words based at least in part on the word of the second set of words.

33 Claims, 9 Drawing Sheets

SYSTEM AND METHODS FOR DETERMINING SEMANTIC SIMILARITY OF SENTENCES

RELATED APPLICATIONS

The present application is related to, and claims the benefit of priority from, the following commonly-owned U.S. provisional patent application(s), the disclosures of which are hereby incorporated by reference in their entirety, including any incorporations-by-reference, appendices, or attachments thereof, for all purposes:

Ser. No. 60/212,304, filed on Jun. 17, 2000 and entitled SYSTEM AND METHODS FOR INFORMATION RETRIEVAL USING SPEECH- AND NATURAL LANGUAGE-BASED QUERIES; and Ser. No. 60/212,486, filed on Jun. 16, 2000 and entitled SYSTEM AND METHODS FOR INFORMATION RETRIEVAL USING SPEECH- AND NATURAL LANGUAGE-BASED QUERIES.

The present application is also related to the following commonly-owned U.S. patent appllcation, the disclosure of which is hereby incorporated by reference in its entirety, including any incorporations-by-reference, appendices, or attachments hereof, for all purposes:

Ser. No. 09/613,849, filed on Jul. 11, 2000 and entitled System and Methods for Document Retrieval Using Natural Language-Based Queries.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to automatic processing of human language. More especially, the present invention relates to systems and methods for automatically determining the semantic similarity of different sentences to one another.

Consider a sentence-matching machine that can accept an input sentence of human language (for example, a sentence of Chinese-language text) and then automatically find one or more sentences, from a database of sentences, that most closely match the input sentence in some sense. Such a sentence-matching machine would be useful. A lighthearted example of a desired use for a sentence-matching machine is as follows. A person expresses an interesting thought in a sentence and then inputs that sentence into the sentence-matching machine. The person wishes the machine to compare the sentence with sentences from a book of famous quotations to see if anyone famous has previously expressed the same or similar thought before in a sentence quoted in the book.

Certain types of sentence-matching machines do exist. Unfortunately, the conventional sentence-matching machine is not well suited to perform the task sought by the person in the above-mentioned example. The reason is that different people, or even the same person on different occasions, are likely to express any given idea using different sets of words. The conventional sentence-matching machine, would not be good at recognizing semantically similar sentences if sufficiently non-overlapping sets of words are used in the sentences.

What is needed is a sentence-matching system and associated methods that can make good judgments of semantic similarity among word sets, e.g., sentences, even when word sets that are semantically similar do not necessarily have words in common. What is especially needed is such a sentence-matching system and associated methods that are operative on word sets that include words of Chinese, or similar languages. The present invention satisfies these and other needs.

SUMMARY OF THE INVENTION

A system and associated methods determine the semantic similarity of different sentences to one another. A particularly appropriate application of the present invention is to automatic processing of Chinese-language text, for example, for document retrieval. According to one aspect of the invention, a method for computing the similarity between a first and a second set of words includes identifying a word of the second set of words as being most similar to a word of the first set of words, wherein the word of the second set of words need not be identical to the word of the first set of words; and computing a score of the similarity between the first and second set of words based at least in part on the word of the second set of words. According to another aspect of the invention, a system for computing the similarity between a first set of words and a second set of words includes means for identifying a word of the second set of words as being most similar to a word of the first set of words, wherein the word of the second set of words need not be identical to the word of the first set of words; and means for computing a score of the similarity between the first and second set of words based at least in part on the word of the second set of words.

DETAILED DESCRIPTION OF A PREFERRED EMBODIMENT

The following description will focus on the currently-preferred embodiment of the present invention, which is operative in an environment typically including desktop computers, server computers, or portable computing devices. The currently-preferred embodiment of the present invention may be implemented in an application operating in an Internet-connected environment and running under an operating system, such as the Linux operating system, on an IBM-compatible Personal Computer (PC) configured as an Internet server or client. The present invention, however, is not limited to any particular environment, device, or application. Instead, those skilled in the art will find that the present invention may be advantageously applied to other environments or applications. For example, the present invention may be advantageously embodied on a variety of different platforms, including Microsoft® Windows, Apple Macintosh, EPOC, BeOS, Solaris, UNIX, NextStep, and the like. Therefore, the description of the exemplary embodiments which follows is for the purpose of illustration and not limitation.

I. Computer-based Implementation

A. Basic System Hardware (e.g., for Server or Desktop Computers)

Figure 1:
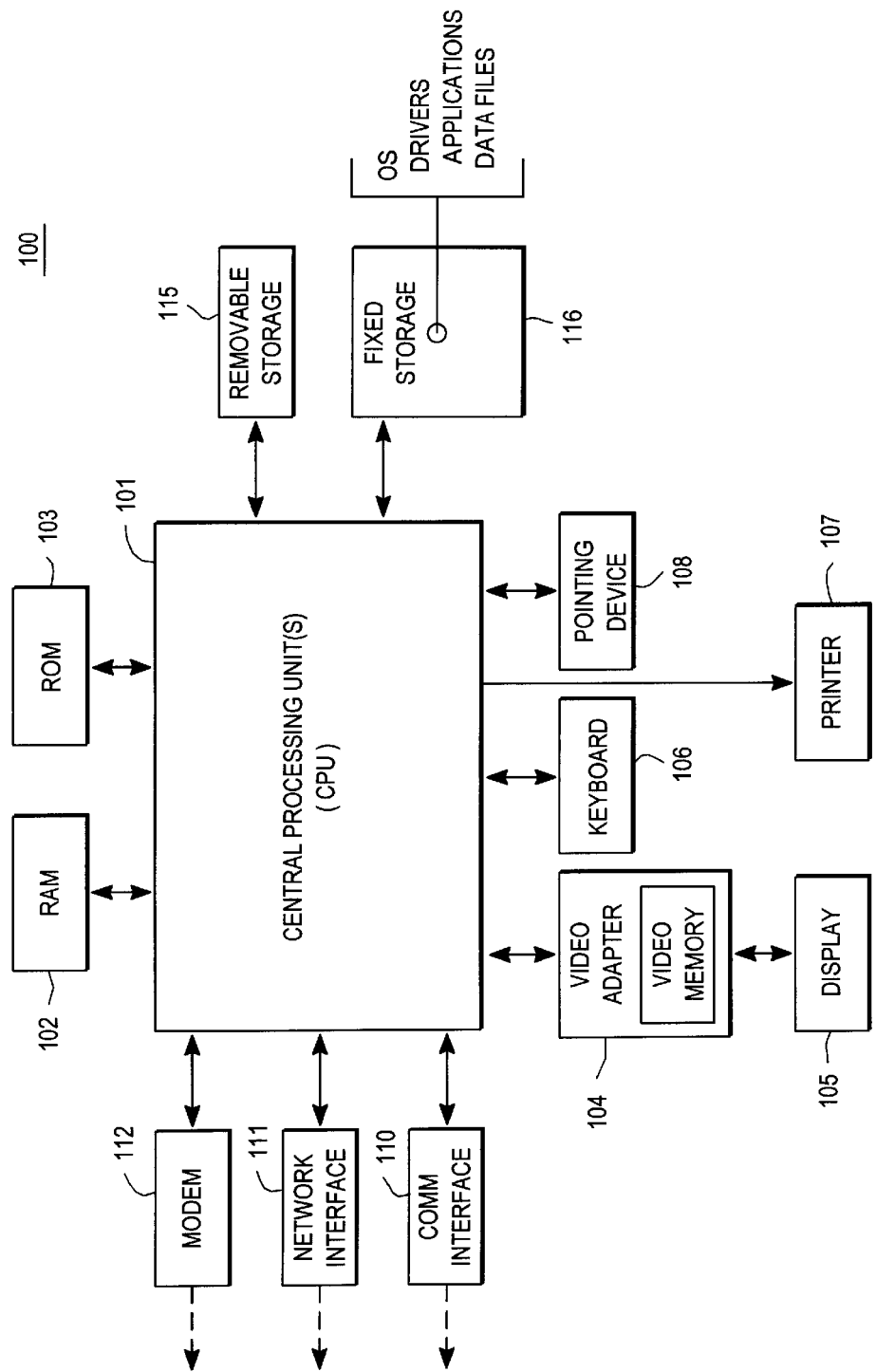
FIG. 1 is a block diagram that depicts a conventional or general-purpose computer system, such as an IBM-compatible personal computer (PC) or server computer or other similar platform, that may be used for implementing the present invention.

The present invention may be implemented on a conventional or general-purpose computer system, such as an IBM-compatible personal computer (PC) configured to be a client or a server computer. FIG. 1 is a general block diagram of an IBM-compatible system 100. As shown, system 100 comprises a central processor unit(s) (CPU) 101 coupled to a random-access memory (RAM) 102, a read-only memory (ROM) 103, a keyboard 106, a pointing device 108, a display or video adapter 104 connected to a display device 105 (e.g., cathode-ray tube, liquid-crystal display, and/or the like), a removable (mass) storage device 115 (e.g., floppy disk and/or the like), a fixed (mass) storage device 116 (e.g., hard disk and/or the like), a communication port(s) or interface(s) 110, a modem 112, and a network interface card (NIC) or controller 111 (e.g., Ethernet and/or the like). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory (RAM) 102 serves as the working memory for the CPU 101. In a typical configuration, RAM of sixteen megabytes or more is employed. More or less memory may be used without departing from the scope of the present invention. The read-only memory (ROM) 103 contains the basic input output system code (BIOS)—a set of low-level routines in the ROM 103 that application programs and the operating systems can use to interact with the hardware, including reading characters from the keyboard, outputting characters to printers, and so forth.

Mass storage devices 115 and 116 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 1, fixed storage 116 stores a body of programs and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 115 and 116 into the main memory (RAM) 102, for execution by the CPU 101. During operation of the program logic, the system 100 accepts, as necessary, user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the computer system 100.

The computer system 100 displays text and/or graphic images and other data on the display device 105. The display device 105 is driven by the video adapter 104, which is interposed between the display 105 and the system. The video adapter 104, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the computer system 100, may be obtained from the printer 107, or other output device. Printer 107 may include, for instance, a Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication interface 110, which may include a RS-232 serial port, a serial IEEE 1394 (formerly, "firewire") interface, a Universal Serial Bus (USB) interface, or the like. Devices that will be commonly connected locally to the communication interface 110 include laptop computers, handheld organizers, digital cameras, and the like.

The above-described computer system 100 is presented for purposes of illustrating the basic hardware that may be employed in the system of the present invention. The present invention however, is not limited to any particular environment or device configuration. Instead, the present invention may be implemented in any type of computer system or processing environment capable of supporting the methodologies of the present invention presented in detail below.

B. Basic System Software

Figure 2:
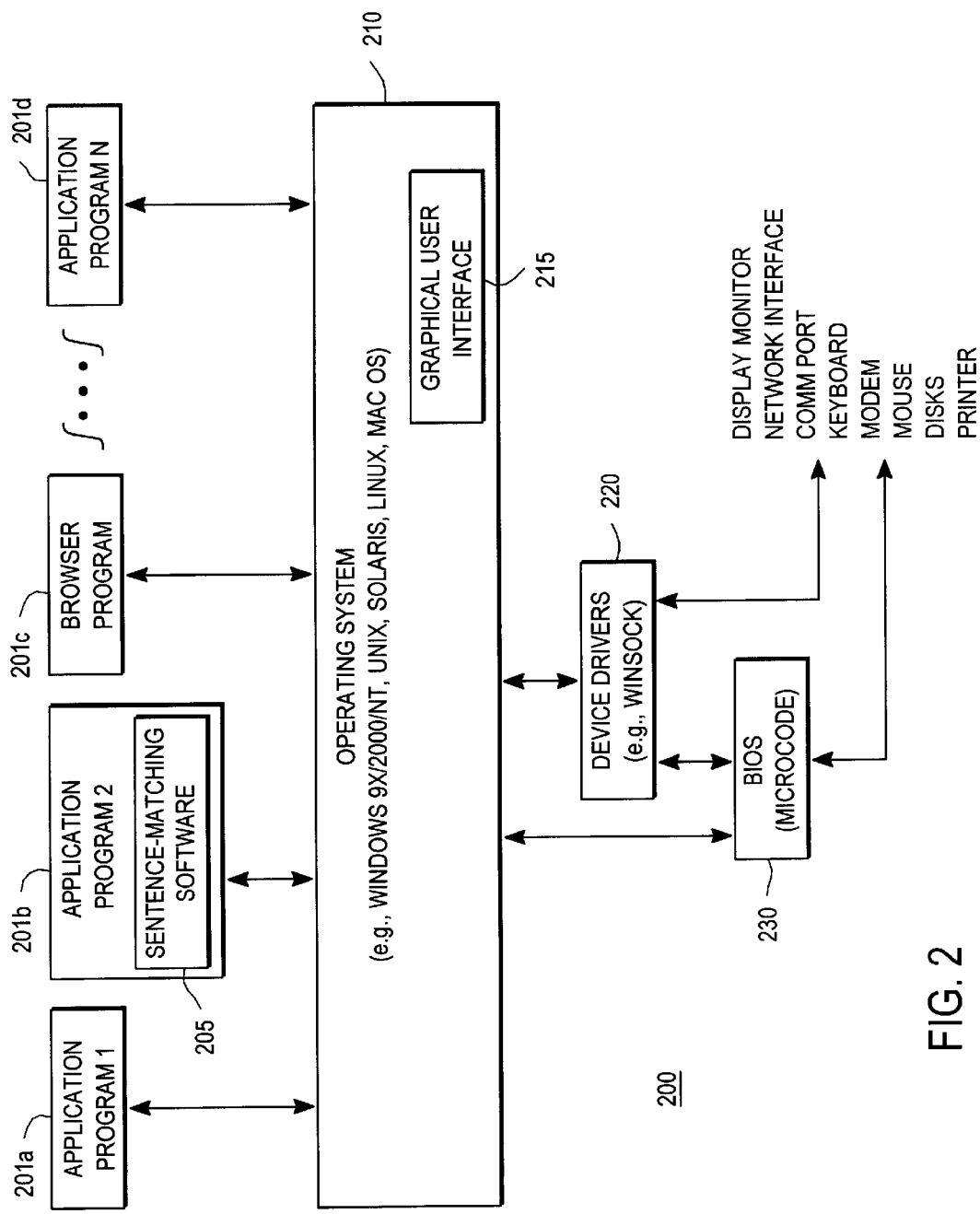
FIG. 2 is a block diagram that depicts a software system for controlling the computer system of FIG. 1.

Illustrated in FIG. 2, a computer software system 200 is provided for directing the operation of the computer system 100. The software system 200, which is stored in the main memory (RAM) 102 and on the fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client or server application software or "programs" 201 (e.g., 201a, 201b, 201c, 201d) may be "loaded" (i.e., transferred from the fixed storage 116 into the main memory 102) for execution by the computer system 100.

The software system 200 preferably includes a graphical user interface (GUI) 215, for receiving user commands and data in a graphical (e.g., "point-and-click") fashion. These inputs, in turn, may be acted upon by the computer system 100 in accordance with instructions from the operating system 210, and/or client application programs 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. The OS 210 can be provided by a conventional operating system, such as Microsoft® Windows 9x, Microsoft® Windows NT, or Microsoft® Windows 2000, all of which are available from Microsoft Corporation of Redmond, Wash., U.S.A. Alternatively, OS 210 can also be another conventional operating system, such as Macintosh OS (available from Apple Computers of Cupertino, Calif., U.S.A.) or a Unix operating system, such as Red Hat Linux (available from Red Hat, Inc. of Durham, N.C., U.S.A.).

Of particular interest, the application program 201b of the software system 200 includes sentence-matching software code 205 according to the present invention. Construction and operation of embodiments of the present invention, including supporting methodologies, will now be described in further detail.

II. Overview of the Semantic Sentence-Matching System

Figure 3:
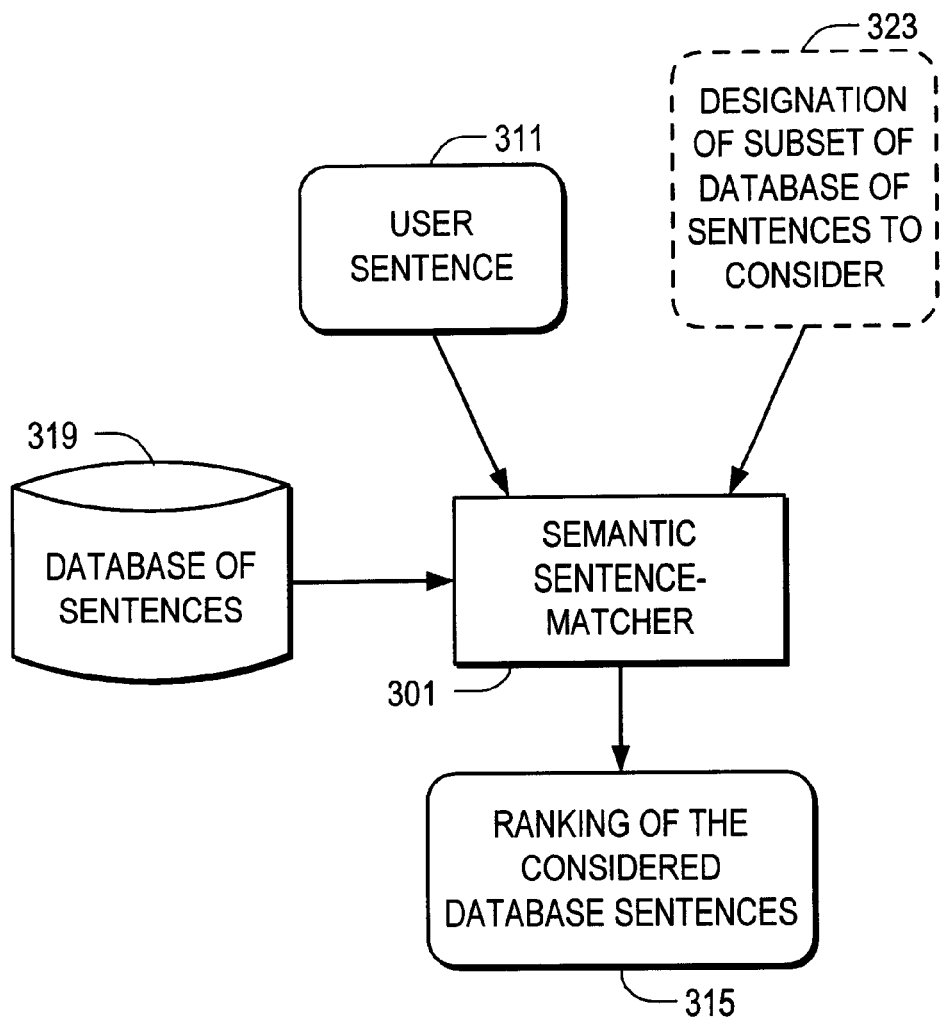
FIG. 3 is a block diagram that shows a system, according to the present invention, for evaluating semantic similarity between sentences.

FIG. 3 is a block diagram that shows a system 301, according to the present invention, for evaluating semantic similarity between sentences. The system 301 may be called the semantic sentence-matcher (SSM) 301 in the present document. The SSM 301 accepts an input sentence 311 and in response produces a ranking 315 of sentences from a database 319 of sentences. The ranking 315 ranks the sentences of the database 319 ("database sentences") according to the similarity of each database sentence to the input sentence 311, for example, in descending similarity. The input sentence 311 and the database sentences are each typically a sequence of words written by a human but more generally may each be any set of terms. Optionally, the SSM 301 accepts a designation 323 that designates just a subset of the sentences of the database 319 as needing to be ranked. The designation 323 may be a set of sentence numbers. If the. SSM 301 receives the designation 323, then the SSM 301 will rank only the designated subset of database sentences in the ranking 315 and not the entire set of database sentences. The SSM 301 can operate using any database 319 of sentences, and the database 319 is also considered to be an input to the SSM 301. Typically, it is expected that a same database 319 will be used repeated for different input sentences 311.

The currently-preferred embodiment of the SSM 301 is particularly suited for use within an automatic document retrieval system, e.g., an online search engine, such as is described in the incorporated-by-reference, commonly-owned, and co-pending U.S. patent application Ser. No. 09/613,849, entitled "SYSTEM AND METHODS FOR DOCUMENT RETRIEVAL USING NATURAL LANGUAGE-BASED QUERIES" and U.S. patent application Ser. Nos. 60/212,304 and 60/212,486, both entitled "SYSTEM AND METHODS FOR INFORMATION RETRIEVAL USING SPEECH- AND NATURAL LANGUAGE-BASED QUERIES". In particular, suppose an online search engine has a large database of pre-stored queries and, for each such database query, a pointer(s) to a document(s) that is most relevant to the query. Then, when a new user query arrives, the online search engine can employ the SSM 301 to find the most similar pre-stored query(ies) to the new user query, so that the pointer(s) associated with the most similar pre-stored query(ies) may be outputted to the user to hopefully answer the new user query. For this preferred use of the SSM 301, the database of pre-stored queries is extremely large, and the online search engine automatically generates the designation 323 of a subset of queries to consider, using a keyword-based method that is further discussed in the incorporated-by-reference, co-pending U.S. patent application Ser. No. 09/613,849. As will be further described, the currently-preferred embodiment of the SSM 301 is configured to operate on sentences that include Chinese-language words, for example, sentences that include mostly Chinese words.

III. Further Description of Conventional Sentence-matching: No Word Semantics Used A conventional sentence-matching machine works by generating a conventional sentence-similarity score between the input sentence and each sentence in the database of sentences and then finding and returning the desired number of highest scoring, i.e., most similar, sentences from the database. The conventional sentence-similarity score is computed for the input sentence and a database sentence by identifying words in the input sentence that also appear in the database sentence, and then for each such word in common, computing a particular conventional contribution to the sentence-similarity score based on that word in common.

The conventional sentence-similarity score is based purely on counting of words and sentences and requires only the input sentence and the database of sentences as input. In computing the conventional sentence-similarity score, individual words are treated as atomic tokens and no attention is paid to the semantics or other characteristics of individual words. The conventional contribution to the sentence-similarity score based on each word in common is based on a quantity known as "Term Frequency times Inverse Document Frequency" (TFIDF). The TFIDF quantity will be further discussed later, but for now, it is helpful simply to note that the conventional contribution based on each word in common is designed to give less weight to words (perhaps "the" or "and") that occur frequently in the overall database and to give more weight to words (perhaps "meditation" or "Churchill") that are relatively infrequently-appearing in the overall database. Words (perhaps "the" or "and") that occur very frequently in the overall database are not considered important or very useful for discriminating between sentences.

The conventional sentence-matching machine is capable of finding database sentences that are similar to the input sentence, as long as the database sentences have words (perhaps "meditation" or "Churchill") in common with the input sentence that are relatively infrequently-appearing in the overall database. Unfortunately, as has been mentioned in the Background section, semantically-similar sentences may often use largely non-overlapping sets of words, and therefore the conventional sentence-matching machine is inadequate for the task of judging semantic similarity.

Figure 4:
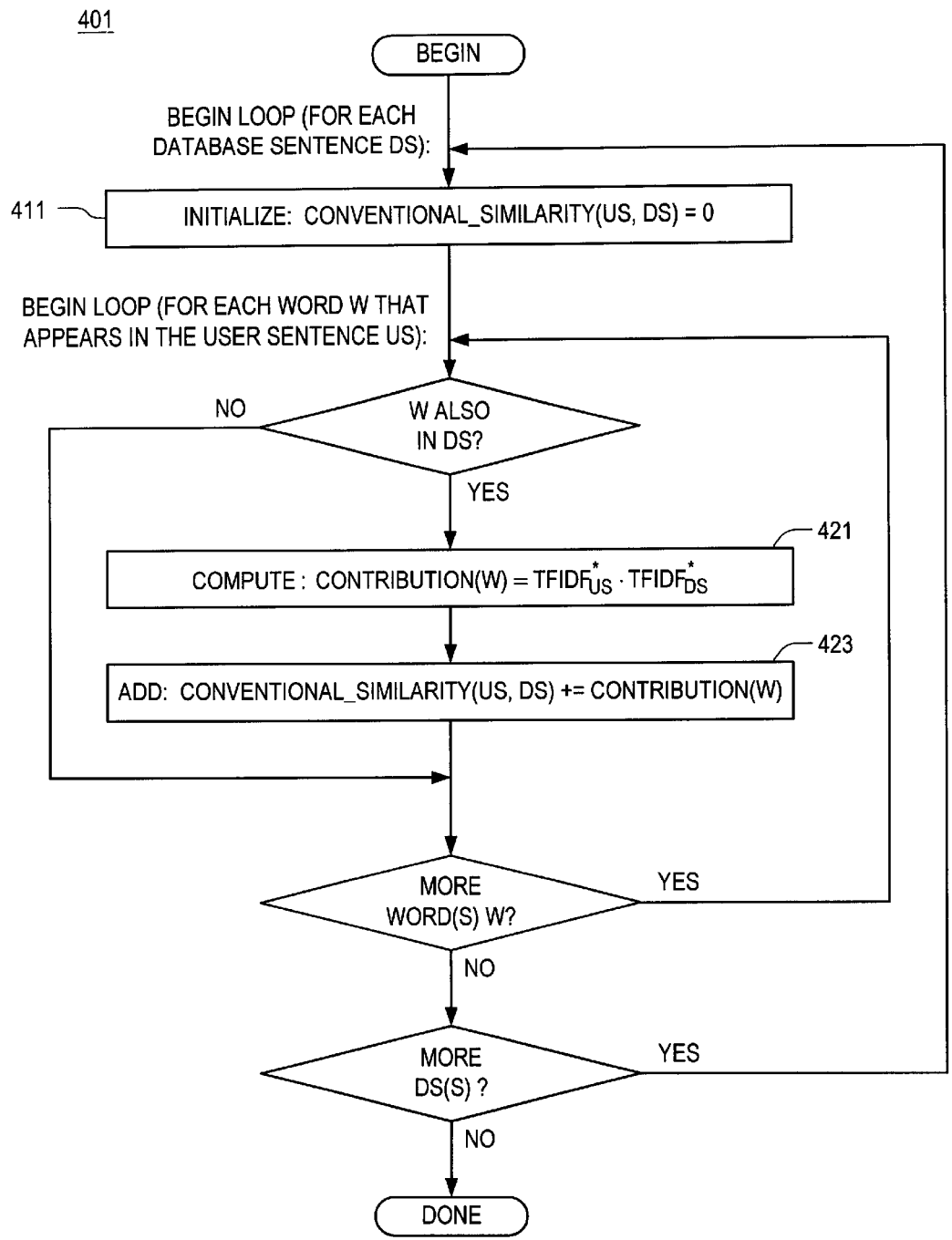
FIG. 4 is a flowchart that shows a conventional method used by the conventional sentence-matching machine to compute its conventional sentence-similarity score.

FIG. 4 is a flowchart that shows a conventional method 401 used by the conventional sentence-matching machine to compute its conventional sentence-similarity score for each sentence DS of a set of database sentences relative the input sentence, which can be called the user sentence US. As shown, there is an outer logic loop over each database sentence being considered. Within each loop iteration, the conventional sentence-similarity score, CONVENTIONAL_SIMILARITY(US, DS), for the particular sentence DS is initialized to zero in a step 411. Next, within the loop iteration, in a step 421, the conventional sentence-matching machine computes the contribution to the sentence-similarity score for one word w that occurs in both the user sentence US and the database sentence DS under consideration. The contribution is accumulated into CONVENTIONAL_SIMILARITY(US, DS) by addition in a step 423. The contribution for each such word w in common is:

$$CONTRIBUTION(w) = TFIDF^*_{US}(w) \cdot TFIDF^*_{DS}(w) \quad \text{(eq. 1)}$$

In the above equation 1, $TFIDF^*_{US}(w)$ is the scaled TFIDF of the word w in the user sentence US and $TFIDF^*_{DS}(w)$ is the scaled TFIDF of the word w in the database sentence DS. The TFIDF of a word w in a sentence S is defined as follows:

$$TFIDF_S(w) = n \cdot \log(M/m) \quad \text{(eq. 2)}$$

In the above equation 2, n is the number of times the word w appears in the sentence S; M is the total number of sentences in the database; and m is the number of sentences in the database that contain the word w. In equation 1, the scaled TFIDF quantities are defined as follows:

$$TFIDF^*_{US}(w) = TFIDF_{US}(w)/\|US\| \quad \text{(eq. 3)}$$

$$TFIDF^*_{DS}(w) = TFIDF_{DS}(w)/\|DS\| \quad \text{(eq. 4)}$$

In equation 3, the scaling factor $(1/\|US\|)$ is the inverse of the geometric magnitude $\|US\|$ of a vector US that is formed by including, as individual vector elements, $TFIDF_{US}(wi)$ for each and every unique word wi in the user sentence US. These vector elements are the only nonzero vector elements of the vector US. Similarly, in equation 4, the scaling factor $(1/\|DS\|)$ is the inverse of the geometric magnitude $\|DS\|$ of a vector DS that is formed by including, as individual vector elements, $TFIDF_{DS}(wj)$ for each and every unique word wj in the database sentence DS. These vector elements are the only nonzero vector elements of the vector DS.
Geometric magnitudes are computed as follows:

$$\|US\| = \sqrt{\sum_{\text{unique } wi \text{ in } US} [TFIDF_{US}(wi)]^2} \quad \text{(eq. 5)}$$

$$\|DS\| = \sqrt{\sum_{\text{unique } wj \text{ in } DS} [TFIDF_{DS}(wj)]^2} \quad \text{(eq. 6)}$$

IV. Methodology For Sentence-matching that Uses Semantics

A. Overview

The SSM 301 (of FIG. 3) uses a semantic sentence-matching method. According to this semantic sentence-matching method, the SSM 301 accepts a user sentence US and generates a (semantic) sentence-similarity score ("SSim") between the user sentence US and each database sentence DS that is being considered from the database of sentences. ("SSim" refers to Sentence Similarity.) The SSM 301 then ranks the databases sentences that have been considered according to their similarity to the user sentence US. The SSM 301 then returns a result that incorporates the rankings of the ranked database sentences in some fashion. For example, the result may include the rank-sorted database sentences, or rank-sorted pointers to the ranked database sentences (e.g., identifiers such as sentence numbers or the like), or rank-sorted pointers to information (e.g., documents) associated with the ranked database sentences.

B. The Method Recognizes Semantically-similar Words, Not Only Identical Words

1. For Each User Word, Find a Similar Word in Each Database Sentence

Figure 5:
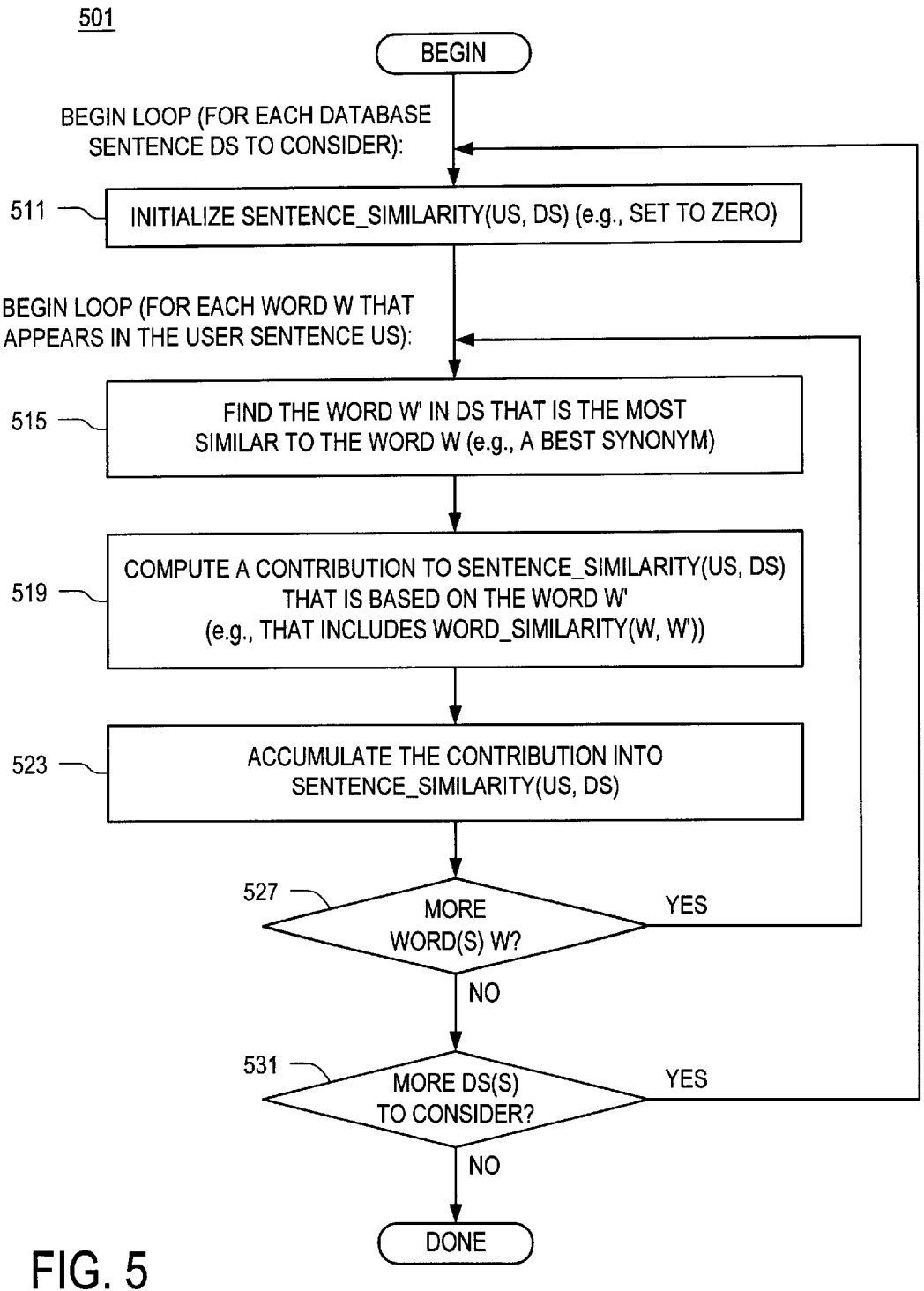
FIG. 5 is a flowchart that shows a method used within the semantic sentence-matching method to generate semantic sentence-similarity scores between the user sentence and each database sentence DS being considered.

FIG. 5 is a flowchart that shows a method 501 used within the semantic sentence-matching method to generate SSims between the user sentence US and each database sentence DS being considered. As shown in FIG. 5, the score, the SSM 301 of FIG. 3 computes SSim(US, DS) for the user sentence US and a database sentence DS as follows. In a step 511, the SSM 301 of FIG. 3 initializes the score SSim(US, DS) to some suitable initial value, for example, zero. Then, for each word w of the user sentence US, in a step 515, the SSM 301 of FIG. 3 searches the database sentence DS for a word w' of the database sentence that is most semantically similar to the word w. (The search for a most similar word w' may be restricted to finding only the most semantically similar word that also exceeds some pre-defined threshold of similarity, e.g., 0.5 on a scale of 0.0 to 1.0.)

2. If a Similar Word is Found, Use its Word Similarity Score

If such a most similar word w' can be found in the database sentence DS, then, in a step 519, the SSM 301 of FIG. 3 computes a contribution to SSim(US, DS) based on the word w of the user sentence US and its most semantically-similar word (e.g., synonym) w' of the database sentence DS. Preferably, the contribution includes a quantitative metric, WSim(w, w'), of the semantic similarity of the words w and w'. ("WSim" refers to Word Similarity and an embodiment of WSim will be further discussed in a later section.) If a contribution has just been computed in the step 519, then, in a step 523, the contribution is accumulated into the SSim(US, DS).

3. Account for Within-sentence Importance of Words

In the method 501, the SSM 301 of FIG. 3 computes (e.g., scales) the contribution to SSim(US, DS) based on each word w so as to reflect the importance of the word w within the sentence US and also to reflect the importance of the word w' within the sentence DS. This computation (e.g., scaling) to reflect within-sentence importance prevents a hypothetical situation in which a super-long sentence that includes every word in the dictionary would always achieve a high SSim with any arbitrary other sentence. By taking within-sentence importance into account, each word in the super-long sentence would have very little importance within the super-long sentence, and therefore, when matched against a genuine sentence of several words, the super-long sentence would achieve only a very low SSim. The computation (e.g., scaling) to reflect relative importance may be performed at any reasonable point, for example, within the step 519, the step 523, and/or a new step (not pictured in FIG. 5) that would be between the loop termination logic points 527 and 531 of FIG. 5.

B. An Embodiment of the Semantic Sentence-matching Method

1. Overview: Vectorize, Scale, and Combine Using Dot Product

The currently-preferred embodiment of the method 501 of FIG. 5 uses a formulation of the metric WSim(w, w') that will be further discussed later. In general, WSim(w, w')

measures the semantic similarity of any two words w and w'. WSim(w, w') takes values between zero (no appreciable similarity) and one (identical word). Instead of zero, the lowest possible value for WSim( ) may be set to another floor value that is less than one, for example, 0.1, or 0.25. The embodiment of the method 501 of FIG. 5 is as follows:

Given a user sentence US that consists of the sequence of words w1, w2, ..., wt, in which t is the number of words in the user sentence US, first conceptually vectorize the user sentence US into an n-dimensional user vector, US, where n is the number of words in the system lexicon (i.e., in the vocabulary). Then, to compute SSim(US, DS) for a database sentence DS, first conceptually vectorize the database sentence DS into an n-dimensional database vector, DS, where n is still the number of words in the system lexicon. (The vectorization is described as conceptual because in actual implementation, most components of the n-dimensional vectors will have zero value and can be ignored completely.) Next, set SSim(US, DS) to the cosine of the two vectors US and DS. The cosine of two vectors is computed simply by scaling each vector to make it a unit vector and then taking the dot product of the two unit vectors. The vectorization process will be discussed immediately below. As will become clear, given the formulation of the vectorization process, the scaling of the US and DS into unit vectors in the cosine computation causes SSim(US, DS) to reflect the within-sentence importance of individual words of the user sentence US and to reflect the within-sentence importance of individual words of the database sentence DS.

2. Details: Combine Non-semantic Measures and Semantic Measures

According to the system lexicon, any word in the vocabulary is uniquely identified by its word position in the system lexicon, i.e., by an integer between 1 and n, inclusive, where n equals the number of words in the system lexicon. The vectorization of the user sentence US is performed as follows. Every word of the system lexicon either appears in the user sentence US or not. For any i-th word of the system lexicon that appears in the user sentence US, set the i-th position (i.e., component) of the user vector US to the IDF ("Inverse Document Frequence") of that i-th word. For the other words of the system lexicon, i.e., for any i-th word of the system lexicon that does not appear in the user sentence US, set the i-th position of the user vector US to zero. Thus, an example user vector US may be partially shown as follows:

$$US=(0, 0, \ldots, IDF(w2), 0, \ldots, IDF(wt), 0, \ldots, IDF(w1), 0, \ldots, 0) \quad (eq. 5)$$

The IDF(w) of a word is defined as follows:

$$IDF(w)=\log(M/m) \quad (eq. 6)$$

In the above equation 6, M is the total number of sentences in the database; m is the number of sentences in the database that contain the word w; and log may be calculated for any decided-upon base, for example, base ten. In an alternative embodiment, the IDF(w) terms of the user vector US (equation 5) may instead be replaced by $TFIDF_{US}(w)$ terms.

The vectorization of the database sentence DS is as follows. First, initialize all positions (i.e., components) of the vector DS to zero. Then, for each word w in the user sentence US, find a word w' in the database sentence DS that has a maximum WSim(w, w'). Preferably, the word w' is further required to exceed some minimum level of similarity, for example, to have a WSim(w, w') that exceeds 0.5 on a scale of 0.0 to 1.0. The word w is an i-th word of the system lexicon. If a word w' has been found, then set the i-th position of the database vector DS to the product of WSim(w, w') and IDF(w). For each word ww of the database sentence DS that has not been used as the most similar word w' for some word w of the user sentence US, set the j-th position of the database vector DS to IDF(ww), where j is the position of the word ww in the system lexicon. Thus, an example database vector DS calculated for a particular user sentence US may be partially shown as follows:

$$DS=(0, 0, \ldots, WSim(w2, w2')\cdot IDF(w2), 0, \ldots, IDF(ww1'), 0, \ldots,$$
$$WSIM(wt, wt')\cdot IDF(wt), 0, \ldots, WSim(w1, w1')\cdot IDF(w1), 0, \ldots, 0) \quad (eq. 7)$$

The computation of cosine(US, DS) is straightforward, according to the ordinary definition of cosine for vectors.

3. An Example

An example of the embodiment of the method 501 of FIG. 5 is as follows:

US="large[1] automobile[2] moves[3] quickly[4] and[5] is[6] green"

DS="big[8] car[9] goes[10] super[11] fast[12]"

In the above listings of the example user sentence US and the example database sentence DS, the bracketed numbers are not part of the sentences; they are merely labels that show the word ID (identifier), according to an example system lexicon, of the preceding word. Suppose the example system lexicon has only the above 12 words and the word order in the system lexicon is as indicated above in brackets. Then, the 12-dimensional user vector US is set as follows:

US=([1:] IDF(large), [2:] IDF(automobile), [3:] IDF(moves), [4:] IDF(quickly), [5:] IDF(and), [6:] IDF(is), [7:] IDF(green), [8:] 0, [9:] 0, [10:] 0, [11:] 0, [12:] 0)

In the above equation, the bracketed text are dimension labels and are not part of the vector's components' values. Suppose further that:

WSim(large, big)=0.8; WSim(automobile, car)=0.9; WSim(move, goes)=0.6;

WSim(quickly, fast)=0.7; WSim(<any word>, <itself>)= 1.0; and for all other word pairs, WSim( )=0.0

Then, the 12-dimensional database vector DS vector is as follows:

DS=([1:] WSim(large, big)·IDF(large), [2:] WSim(automobile, car)·IDF(automobile), [3:] WSim(moves, goes)·IDF(moves), [4:] WSim(quickly, fast)·IDF(quickly), [5:] 0, [6:] 0, [7:] 0, [8:] 0, [9:] 0, [10:] 0, [11:] IDF(super), [12:] 0)

In the above equation, the bracketed text are dimension labels and are not part of the vector's components' values.

4. Further Optimizations, Based on Part of Speech or on Exact Match

In the preceding discussion, it is seen that when a word w of the user sentence is closely matched to a word w' of the database sentence, then the contribution from the WSim of those two words depends on the significance, or discriminating ability of the word of the user sentence. This significance is measured by IDF, as has been mentioned. In an alternative embodiment of the present, the metric of significance is given an extra boost if the user word w and the database word w' are in fact identical (e.g., WSim(w, w') equals one), and/or if the words are the same part of speech, and/or if the primary part of speech of each word is noun. In particular, if w and w' are identical, and the primary part of speech of each word is noun, then the significance metric used in equations 5 and 7 are not IDF, but two times IDF.

V. Computing Semantic Sentence-similarity Scores (SSim) Efficiently in Realtime

A. The IDFs and WSims are Pre-computed

Preferably, the SSM 301 of FIG. 3 is configured to pre-compute once and store the IDFs and semantic word-similarity scores (WSims) as early as possible. In this way, when an input user sentence 311 of FIG. 3 is accepted, the SSM 301 may efficiently produce its ranking 315 of FIG. 3 efficiently in real-time by consulting the pre-computed IDFs and WSims without having to re-compute any IDFs or WSims.

Figure 6:
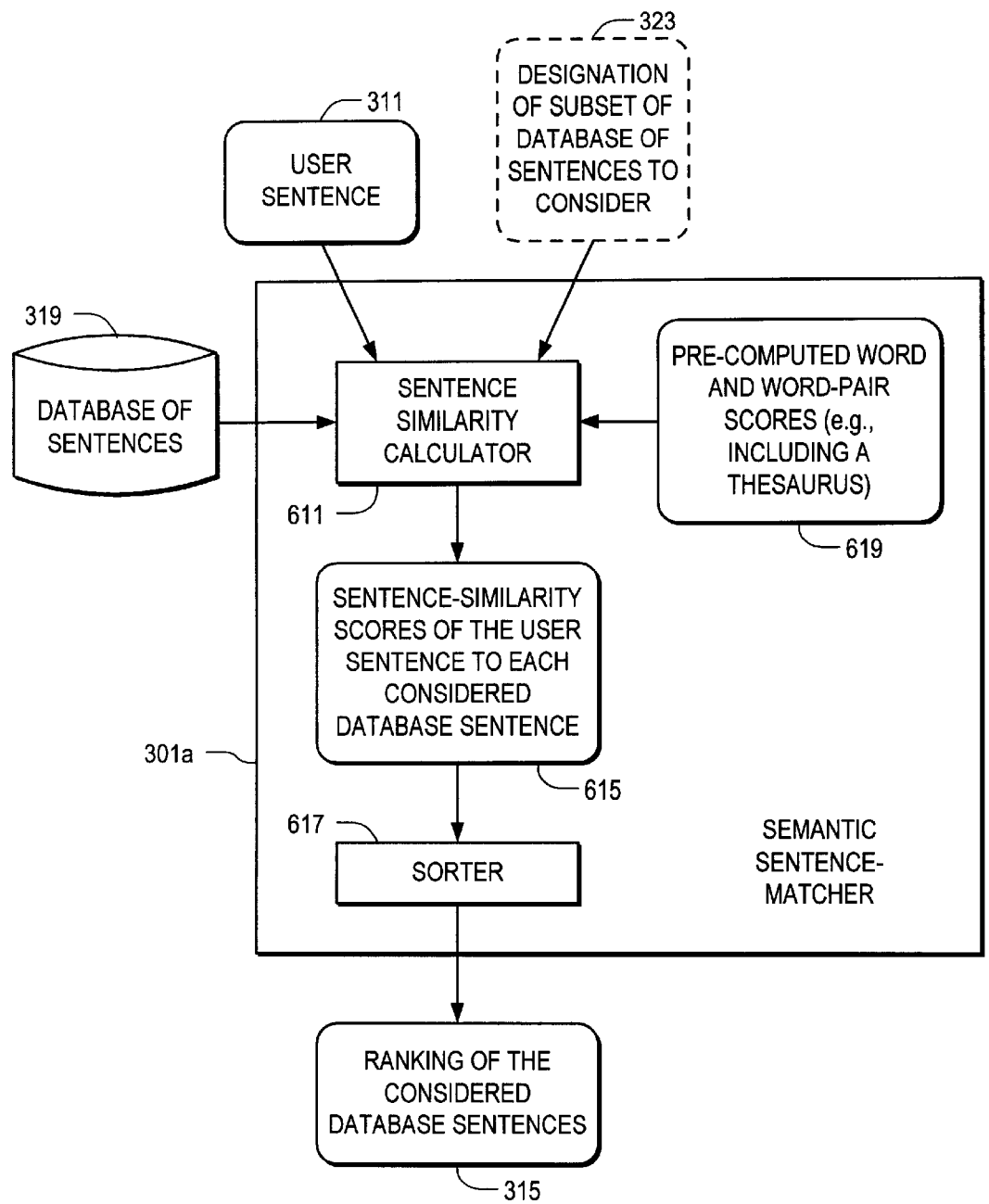
FIG. 6 is a block diagram that shows an embodiment of the system of FIG. 3 in greater detail.

FIG. 6 is a block diagram that shows an embodiment 301*a* of the SSM 301 of FIG. 3 in greater detail. As shown, the SSM 301*a* includes a sentence similarity calculator 611 that implements the method 501 of FIG. 5 to generate SSims 615. The sentence similarity calculator 611 preferably uses a system lexicon 619 that includes pre-computed word and word-pair scores, which include the IDFs for all words of the vocabulary and WSims for all word pairs in the vocabulary. The system lexicon 619 provides a way to quickly look up any word to find any other words that exceed some arbitrary threshold of similarity with respect to the word. These other words may be loosely called the synonyms of the looked-up word, and the system lexicon 619 may be considered to include a thesaurus or "synonym dictionary". As a practical convenience, the system lexicon 619 may be kept to a relatively small size by storing, for each word to be looked up, only the most semantically similar other words and the precise WSims to these other words. For other, less-similar words (i.e., words whose WSim to the looked-up word are less than some threshold, for example, 0.5), the precise WSim is not stored and is thereafter assumed to be some floor value, for example, 0.25, or 0.1, or zero, or is thereafter never needed by any method.

B. The IDFs and WSims are Efficiently Stored in the System Lexicon

1. Overview: a Thesaurus Lexicon and a Supplemental Lexicon

Figure 7:
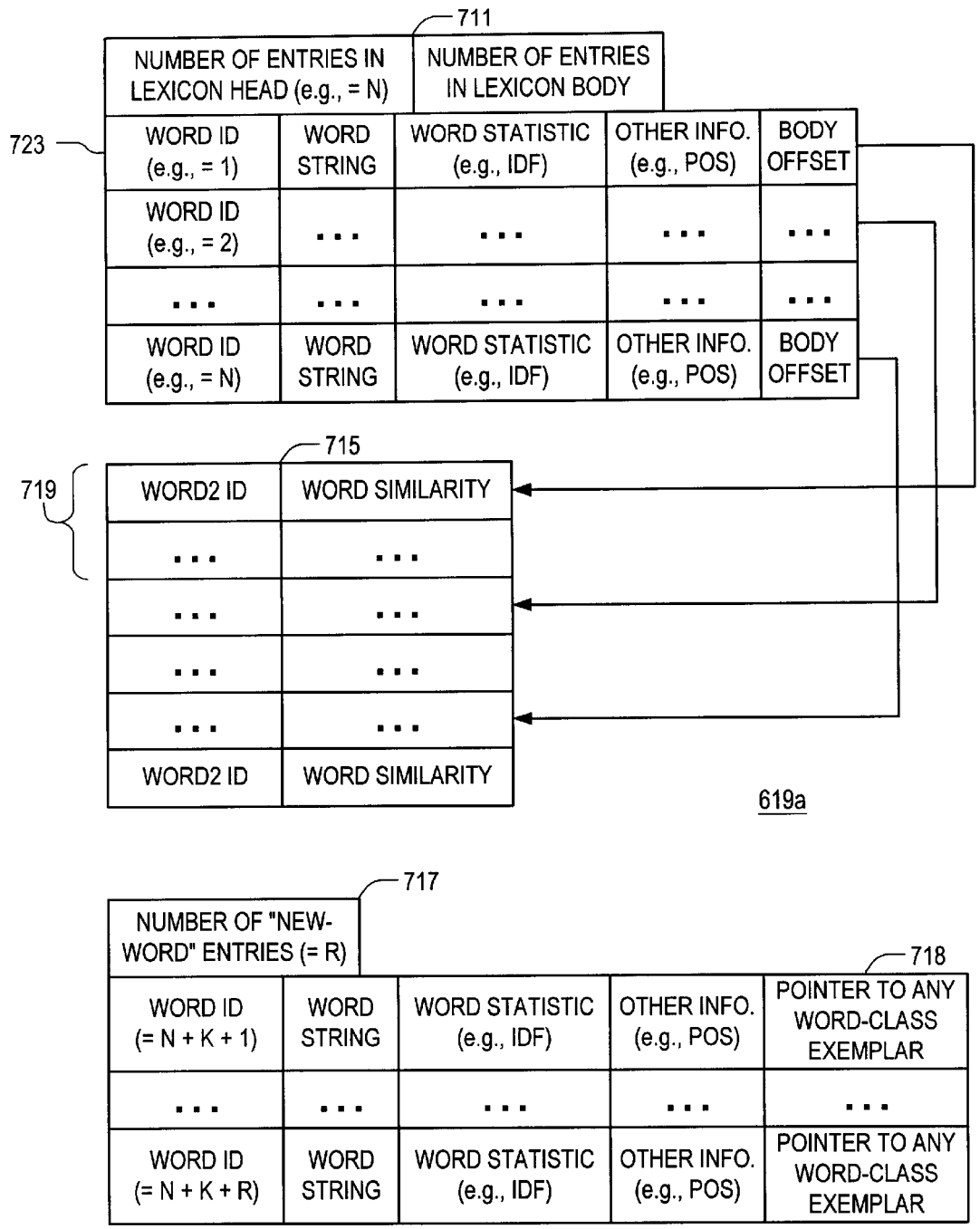
FIG. 7 is a schematic diagram that shows the structure of the currently-preferred embodiment of the system lexicon of FIG. 6.

FIG. 7 is a schematic diagram that shows the structure of the currently-preferred embodiment 619*a* of the system lexicon 619 of FIG. 6. The system lexicon 619*a* includes a head portion 711 ("lexicon head") and a body portion 715 ("lexicon body") that together form a thesaurus lexicon. The lexicon 619*a* also includes a supplemental lexicon 717. In general, the thesaurus lexicon contains a set of words and full semantic information for those words. In general, the supplemental lexicon 717 contains another set of words with limited or no semantic information for the words. As will be further discussed, the supplemental lexicon 717 is suited for holding words that are easily added to the system lexicon without having to create detailed semantic information for them.

2. The Thesaurus Lexicon (which is Configured for Efficient Access)

a. The Lexicon Head Lists the Thesaurus Lexicon's Words

The lexicon head 711 of the thesaurus lexicon includes at its very front a count of the number of word-entries in the lexicon head 711, as well as a count of the number of entries in the lexicon body 715. Next, the lexicon head 711 includes a single entry for each word of the thesaurus lexicon. This entry includes the word's word ID, its word text string, its IDF, and any other information, such as the word's possible part(s) of speech (POS), for example, noun, verb, adjective, and/or the like. The entry for each word in the lexicon head 711 further includes a pointer (e.g., offset value) to the beginning of that word's associated block of entries in the lexicon body 715. Preferably, for compactness, only one POS (for example, noun, verb, adjective, or the like) is stored for each word; this stored POS is the most probable part of speech for the word. The IDF is an example of a non-semantic statistical parameter for a word, i.e., a statistical quantity that is computed without explicitly taking semantic information into account. The IDF, in particular, is computed exclusively based on counting words and sentences in the database of sentences and treating words as atomic tokens without needing to consult other language information.

The entries in the lexicon head 711 are ordered relative to one another according to the text-sort order of the word string. For example, for a Chinese-language version of the thesaurus lexicon, the entries of the lexicon head 711 are ordered according to sort-order of the GB Chinese-character encoding standard. Preferably, from the point of view of run-time computational efficiency, any word's position in the lexicon head 711 is its integer word ID that is used internally to uniquely identify words of the thesaurus lexicon; if this is the case, than any word ID can be used as a direct numerical index into the entries of the lexicon head 711 for the purpose of finding that word ID's word's entry. If each word's word ID is not necessarily its position in the lexicon head 711, then any given word ID cannot generally be used as a direct index into the lexicon head 711 but instead should be used as the key with which to search the lexicon head 711's word ID field for the entry that contains the word ID. In an important embodiment of the present invention, the word ID of each word is not necessarily the position of the word's entry in the lexicon head 711. In that important embodiment, the word IDs in the lexicon head 711 are in ascending order. Therefore, the efficient binary search algorithm may be used to find the entry corresponding to any given word ID. In the remainder of the present document, discussion may assume that a word's word ID equals the word's entry's position in the lexicon head 711; it should be understood that such an assumption is for ease of discussion and is not a requirement for all embodiments of the present invention.

b. The Lexicon Body Lists Each Word's 'Synonyms' and Scores

The lexicon body 715 is a sequence contiguous blocks. Each block contains all the "synonyms" for a particular word of the lexicon head 711. Each block includes one entry for each such synonym of the particular word that is associated with the block. Each such entry includes the synonym's word ID and the synonym's WSim with the particular word. A synonym for any particular word is defined as all words having a WSim, with the particular word, that is higher (or no lower than) than some threshold, for example, 0.5. All words that are not in the block for the particular word, i.e., that are not synonyms of the particular word, may be assumed, for practical convenience, to have a WSim with the particular word that equals some floor value, for example, 0.25, 0.1, or zero. The blocks in the lexicon body 715 are ordered relative to one another according to their words' relative order in the lexicon head 711. Thus, the first block 719 of the lexicon body 715 is for use in connection with the first entry 723 of the lexicon head 711 (i.e., word ID 1), and the i-th block is for use in connection with the n-th entry of the lexicon head 711 (i.e., word ID i). (In reality, it is possible for some blocks to be null blocks, i.e., zero-sized blocks, if they correspond to particular words that have no synonyms.) Within each block, the synonym entries are ordered according to the order of the synonyms' word IDs.

3. Methodology for Efficiently Accessing the Thesaurus Lexicon

Due to the structure of the thesaurus lexicon and the ordering of its entries, looking up words in the thesaurus lexicon (e.g., a thesaurus lexicon of Chinese words) is efficient, and can be performed as follows:

(1) Given a word string (e.g., a Chinese word string), the well-known binary search algorithm is used to search in the lexicon head 711 for an entry that matches the word string. If found, the word ID of the word can be read from the entry, and the IDF of the word can be read from the entry.

(2) Given a word ID, its word string (e.g., a Chinese word string) and its IDF can be retrieved simply by using the word ID as an index into the lexicon head 711 (or as a search key to find the lexicon-head entry having the word ID), if the word ID is no greater than the number of word entries in the lexicon head 711.

(3) Given two word IDs w1 and w2 of words in the thesaurus lexicon, their WSim(w1, w2) can be retrieved as follows:

(3.1) using w1 as an index into the lexicon head 711 (or as a search key to find the lexicon-head entry having the word ID), retrieve the offset of the front of the block of entries, in the lexicon body 715, that are associated with the word w1;

(3.2) using w1+1 as an index into the lexicon head 711, retrieve the offset of the front of the block of entries, in the lexicon body 715, that are associated with the word w1+1.

(3.3) All the synonyms of the word with index w1 are in the block of synonym entries delimited by the two offsets; use the binary search technique within the delimited block to find the synonym entry, if it exists, that includes the word ID w2; if such an entry is found, then use the WSim within it; if not, then use the floor value of WSim (for example, 0.25, 0.1, or 0.0) that has been chosen for non-synonyms.

4. The Supplemental Lexicon a. Overview: Contains Words not in the Thesaurus Lexicon The supplemental lexicon 717 lists additional words not found in the thesaurus lexicon of FIG. 7. For simplicity, the supplemental lexicon 717 has a structure that is very similar to the structure of the lexicon head 711 of the thesaurus lexicon. The supplemental lexicon includes at its very front a count of the number of word-entries in the supplemental lexicon 717. Next, the supplemental lexicon 717 includes a single entry for each word of the thesaurus lexicon. This entry includes the word's word ID, its word text string, its IDF, and any other information, such as the word's possible POS(s). Preferably, for compactness, only one POS is stored for each word; this stored POS is the most probable part of speech for the word.

The word ID of each word of the supplemental lexicon 717 is preferably that word's index in the supplemental lexicon 717 plus a constant offset that is no less than the highest possible word ID in the thesaurus lexicon. For example, if the highest allowable word ID in the thesaurus lexicon is N, then the constant offset is preferably N+K, where K is a non-negative integer. In this way, word IDs are unique in the system lexicon 619a, regardless of whether a word is found in the thesaurus lexicon or the supplemental lexicon 717. The entry for each word in the supplemental lexicon 717 may or may not further include a pointer 718 (proxy pointer) to that word's proxy word in thesaurus lexicon's lexicon head 711, as will be further discussed.

b. A Supplemental Lexicon's Word may have a Proxy Word

In general, word of the supplemental lexicon 717 belong to either of two types. The first type corresponds to words that are expected (i.e., assumed) by the system builder (a person) to have no synonyms, or similar words, according to the expected use of the SSM 301 of FIG. 3. For example, depending on the expected use of the SSM 301, the system builder may consider many proper nouns, such as "George Washington" to have no useful synonym. More specifically, the system builder may expect that users of the SSM 301, when looking for a sentence similar to "tell me about George Washington", will not be interested in pre-stored sentences that involve words (e.g., people) that may be considered in some sense to be "similar" to George Washington. Words of the first type have no proxy words in the thesaurus lexicon, and thus such words of the first type have a null pointer 718.

The second type of words in the supplemental lexicon 717 correspond to words that should have synonyms, or similar words, but for some reason are not intended by the system builder to be added as words directly into the thesaurus lexicon. These words of the second type each have a single proxy word in the thesaurus lexicon. For each word of the second type, its proxy pointer 718 points to the proxy word's entry in the lexicon head 711 of the thesaurus lexicon. The proxy word's synonym(s) or word similarity scores are deemed to be the word's own synonym(s) or word similarity scores. Thus, to find the synonym(s) or word similarity scores for a word of the second type, it is only necessary to follow the proxy pointer 718 to find and return the synonym (s) or word similarity scores of the word's proxy word. An example of the second type of word may be, for example, a slang term that has arisen that has a meaning that is essentially identical to that of a word already in the thesaurus lexicon. Another example is an English word in the supplemental lexicon 717 whose proxy word is the Chinese word that has the same meaning as the English word.

Note that the supplemental lexicon is described as being separate from the thesaurus lexicon, in many ways, and is shown as a separate entity in FIG. 7. Of course, an actual implementation of the supplemental lexicon may use data structures that intermingle the pieces of the supplemental lexicon and the thesaurus lexicon, according to the implementor's preference.

C. Methodology for Efficiently Accessing the System Lexicon

Looking up words in the system lexicon can be efficiently performed as follows:

(1) Given a word string (e.g., a Chinese word string), use the well-known binary search algorithm to search in the supplemental lexicon 717 for an entry that matches the word string. If found, the word ID of the word and the IDF of the word can be read from the entry in the supplemental lexicon 717. If not found, attempt to find the word string in the thesaurus lexicon, as has been discussed. If the word is not found in the thesaurus lexicon, then (2) Given a word ID, if the word ID is no greater than the highest allowable word ID (e.g., 80,000) of the lexicon head 711 of the thesaurus dictionary, then the word is in the thesaurus dictionary, and the word's word string (e.g., a Chinese word string) and its IDF can be retrieved, as discussed earlier, simply by using the word ID as an index into the lexicon head 711 (or as a search key to find the lexicon-head entry having the word ID). Alternatively, if the word is not in the thesaurus dictionary, then subtract the constant offset (N+K) from the word ID. The result will be no greater than the number of word entries in the lexicon head 711 (if the word ID is valid). Use the result as an index into the supplemental lexicon 717 to retrieve the word's word string (e.g., a Chinese word string), its IDF, and/or its other information.

(3) Given two word IDs w1 and w2, their WSim(w1, w2) can be retrieved as follows. If w1 and w2 are identical, then return the maximum value, e.g., 1.0, as their WSim. Else, if either w1 or w2 is a word in the supplemental lexicon 717 that has no proxy word in the thesaurus dictionary, then return the floor value of WSim (for example, 0.25, 0.1, or 0.0) that has been chosen for non-synonyms. Else, if both words w1 and w2 are words in the thesaurus lexicon, then use the method previously discussed for looking up WSim(w1, w2) in the thesaurus dictionary. Else, one or both words w1 and w2 is a word in the supplemental lexicon 717 and has a proxy word in the thesaurus lexicon; replace each such word ID with the word ID of its proxy word and then use the resulting pair of word IDs to look up WSim( ) using the method previously discussed for looking up WSim( ) in the thesaurus dictionary.

D. Framework for Constructing the System Lexicon

Figure 8:
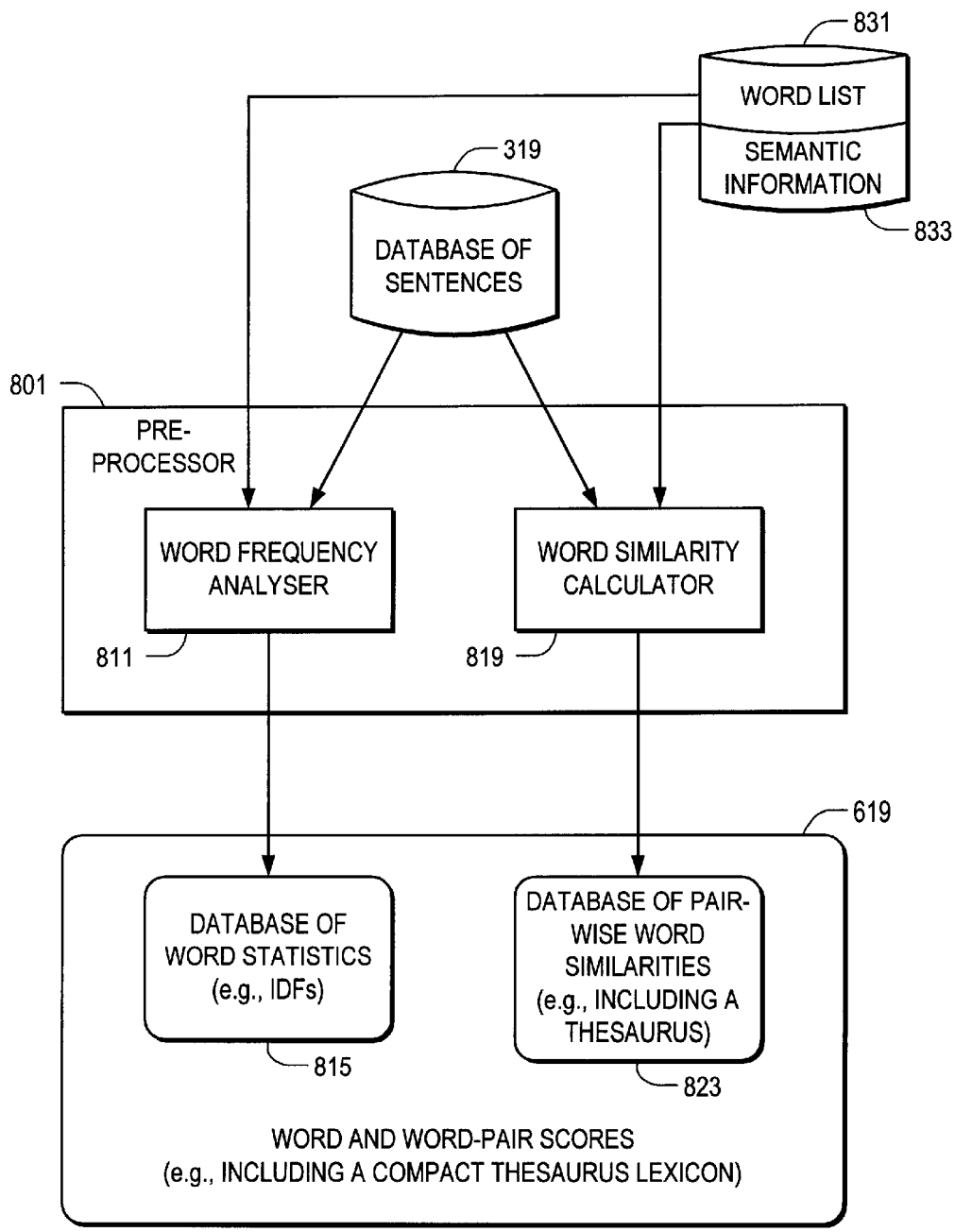
FIG. 8 is a block diagram that shows a pre-processing system for pre-computing the system lexicon of FIGS. 6 and 7.

FIG. 8 is a block diagram that shows a pre-processing system 801 for pre-computing the system lexicon 619 that contains word and word-pair scores. The pre-processing system 801 includes a word-frequency analyzer 811 that computes a database 815 of word scores (e.g., IDFs that are placed into the lexicon head 711 and the supplemental lexicon 717 of FIG. 7). The pre-processing system 801 of FIG. 8 also includes a word-similarity calculator 819 (WSCalculator) that computes a database 823 of pair-wise word similarity scores (e.g., WSims that are placed into the lexicon body 715 of FIG. 7). The database 815 of word scores and the database 823 of pair-wise word similarity scores are for inclusion into the system lexicon 619. The word-frequency analyzer 811 simply computes IDFs using the database 319 of sentences according to the formula for IDF. The word-similarity calculator 819 executes a method that will shortly be further discussed for computing WSim between all word pairs.

The word similarity calculator 819 uses a database that includes a word list 831 and semantic information 833, which will be further discussed, for words. The database made up of the word list 831 and semantic information 833 is itself a raw lexicon (including a thesaurus) that the pre-processing system 801 digests into the system lexicon 619, which is compact and efficient to use. The word list 831 and semantic information 833 are preferably in text format, for ease of viewing and modification by system developers. The word list 831 preferably includes two separate lists, one for words having semantic information (e.g., words that will go into the thesaurus lexicon of FIG. 7) and another for words that do not have semantic information (e.g., words that will go into the supplemental lexicon of FIG. 7). During operation, the database 319 of sentences is converted into an integer-based form such that all words are represented by their integer word IDs, according to the word IDs stored in the word list 831. The pre-processing system 801 may be considered to be a part of the SSM 301 of FIG. 3.

G. Adding New Words to the System Lexicon

1. Introduction: it is Easier to Add Words to the Supplemental Lexicon

As was mentioned in the previous section, the semantic information 833 of FIG. 8 is used in computing WSim between all word pairs. In principle, new words may be added to the lexicon by adding new words to the word list 831, manually creating and inserting semantic information for the new words into the semantic information 833, adding any new sentences that use the new words to the database 319 of sentences, and then running the pre-processing system 801 to establish the run-time lexicon 619. In this way, the new words are added to the thesaurus lexicon of FIG. 7. However, according to the preferred embodiment of the present invention, there is a shortcut method for adding words to the system lexicon. The shortcut method is to add the new words into the supplemental lexicon 717 of FIG. 7. In adding a new word into the supplemental lexicon 717, if the new word has no meaningful synonym, then the new word's proxy pointer is set to null. Alternatively, if the new word may have meaningful synonym(s), then the new word's proxy pointer is set to point to a word in the thesaurus lexicon whose synonym(s) and word similarities will be used as the new word's. One advantageous characteristic of the shortcut method is that it can be used even by individuals (system builders) who do not possess sufficient linguistic expertise to create and insert semantic information for words. Another advantage is that different words in the supplemental lexicon can be synonymous by sharing the same proxy word in the thesaurus lexicon.

2. The Preferred Embodiment Uses a Substantial Supplemental Lexicon

As will be further discussed, in the preferred embodiment of the present invention, the semantic information in the raw lexicon 831 makes use of an existing semantic classification system that includes classifications for about 50,000 Chinese words. In the preferred embodiment of the present invention, which is used in an online document retrieval system, the more than about 50,000 words of the existing semantic classification system are extended, using the shortcut, to include more than about 250,000 further words. These further words include English words, numbers, proper nouns (e.g., names of people, companies, places, titles, and the like). Preferably, these new words are manually collected from documents found on the Internet. For the total vocabulary of more than about 300,000 words (e.g., about 330,000 words obtained by extending an existing semantic classification system of about 50,000 words with about 230,000 new words).

VI. Create Word Classes, Using Proxy Words, to Explicitly Handle Related Words

The supplemental lexicon 717 may be used as a mechanism for implementing word classes whose member words are artificially deemed to be highly similar to one another (e.g., to be identical and to have WSim of 1.0). For example, suppose that the system builder (a person) believes that certain words, such as "Leon Lai" or "Coco Lee" (both are popular singers) are highly similar to each other, for the intended use of the SSM 301 of FIG. 3. More specifically, the system builder may expect that users of the SSM 301, when looking for a sentence similar to "tell me about Leon Lai", will also be interested in pre-stored sentences that involve other singers. The system builder would then create a word class "<SINGER>" and place each member of that word class, for example, the words "LEON LAI" and "COCO LEE", into the supplemental lexicon 717, each with the word class name, "<SINGER>", as the proxy word. In this way, WSim("LEON LAI", "COCO LEE") will have a maximal value.

The IDF that is computed for each word of a word class may be the IDF of the word. Alternatively, the IDF for each word of the word class is the IDF of the entire word class, which is computed by treating each word (e.g., "COCO LEE") of the word class in the database 319 of sentences as if that word were the word class name (e.g., "<SINGER>"). Optionally, in computing the IDF of the entire word class, and indeed, in computing the IDF of all words, certain sentences are ignored, i.e., treated as if they did not exist.

The ignored sentences are sentences that would be redundant if all words in the sentence database were treated as their class names. (For example, "who is Leon Lai" and "who is Coco lee" would be considered to be identical, and they would be conceptually collapsed into a single sentence "who is <singer>" for the purpose of IDF computations.)

In the preferred embodiment of the present invention, which is used by an online document retrieval system, word classes are used. The use of the ranking 315 returned by the SSM 301 of FIG. 3 by the online document retrieval system includes special handing of ranked sentences that involve word classes. Such special handing is further discussed in the incorporated-by-reference, co-pending U.S. patent application Ser. No. 09/613,849.

VII. Definition and Computation of WSim

A. The Preferred Embodiment is Configured for the Chinese Language

As has been mentioned, the preferred embodiment of the present invention is configured for operating on sentences with Chinese words. Therefore, it may be helpful to review some characteristics of the Chinese language. In Chinese, a word is formed by combining one, or typically more than one, ideographic Chinese characters. There are many more commonly-used Chinese characters (thousands) than the mere 26 characters (letters) of the English language's alphabet. From the commonly used Chinese characters, tens of thousands of commonly used words may be formed. Like English words, each Chinese word may have multiple definitions, and may be used as different parts of speech (POS), for example as a noun or instead as a verb, and so forth.

B. WSim Preferably Reflects Semantic, Syntactic, and/or Lexical Similarity Different formulations are possible for the word-similarity metric, WSim. In the preferred embodiment of the present invention, WSim is formulated (i.e., defined) to reflect semantic, syntactic and lexical similarity. These three types of similarity will be further discussed. Of these three types, semantic similarity is most important, lexical similarity is next most important, and syntactic similarity is least important. Optionally, for simplicity, WSim may be formulated to reflect less than all three types of similarity—for example, to reflect only semantic similarity, or only semantic and lexical similarity, or only semantic and syntactic similarity.

C. Methodology for Computing WSim

1. Overview

Figure 9:
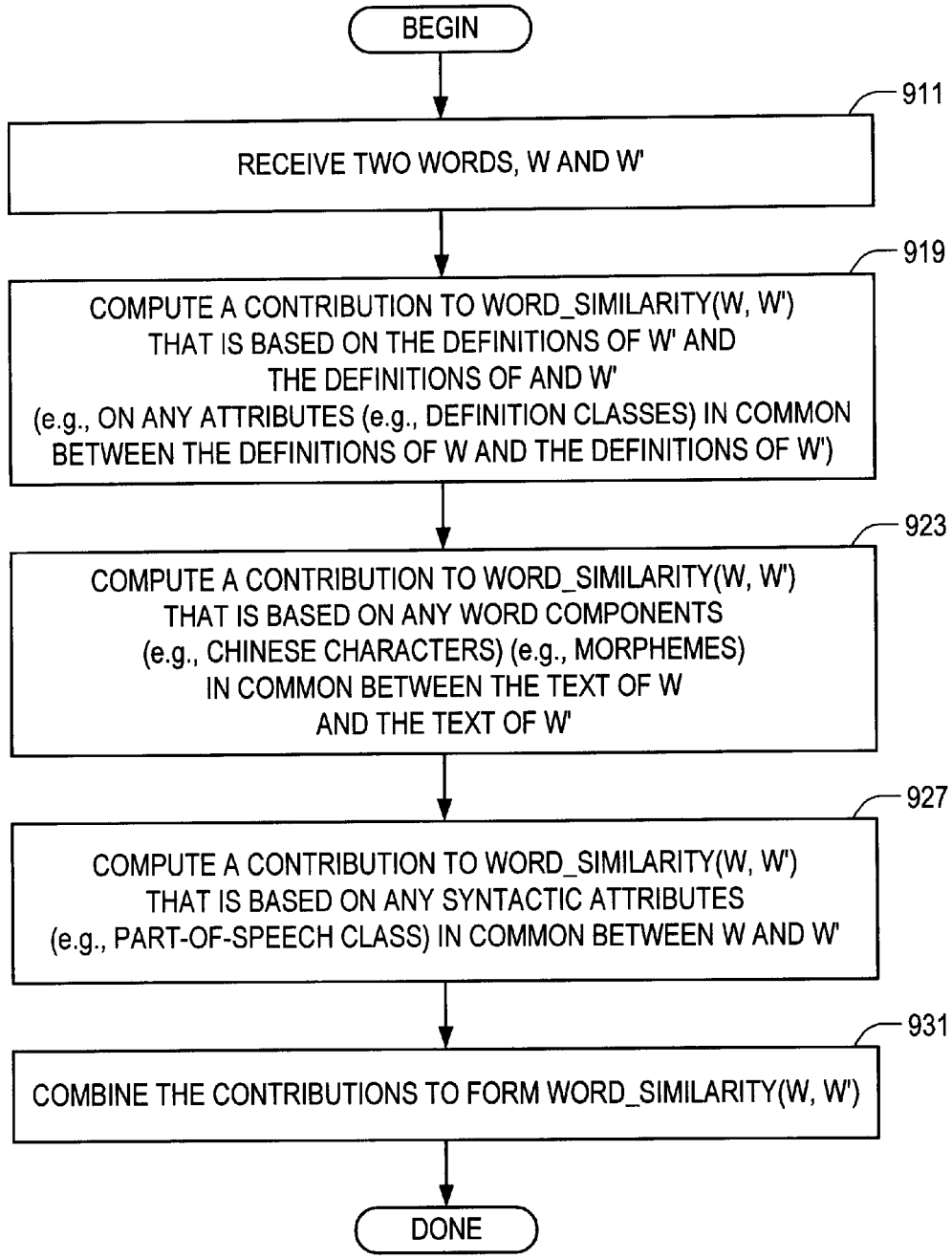
FIG. 9 is a flowchart that shows a method for computing the word similarity between two words.

FIG. 9 is a flowchart that shows a method 901 for computing the WSim between two words w and w'. The method 901 is executed by the WSCalculator 819 of FIG. 8. As shown in FIG. 9, in a step 911, the WSCalculator 819 receives the words w and w'. In the preferred embodiment of the present invention, the words w and w' may be Chinese words made up of Chinese characters. In a step 919, the WSCalculator 819 computes a semantic similarity that will be a contribution to WSim(w, w'). In a step 923, the WSCalculator 819 computes a lexical similarity that will be a contribution to WSim(w, w'). In a step 927, the WSCalculator 819 computes a syntactic similarity that will be a contribution to WSim(w, w'). Finally, in a step 931, the WSCalculator 819 combines the contributions to form WSim for the words w and w'. As should be clear, or as should become clear, the lexical and the syntactic similarities are used in the present invention for their indirect indication of overall semantic similarity.

According to some embodiments of the present invention, computation of WSim(w, w') may be conceptualized as (1) a vectorizing of the words w and w' into word vectors $\underline{w}$ and $\underline{w}'$, respectively, and (2) a combination of the vectors $\underline{w}$ and $\underline{w}'$ using the cosine function for vectors. The vectors $\underline{w}$ and $\underline{w}'$ have the same dimensions. The vectors $\underline{w}$ and $\underline{w}'$ each have a lexical component(s), a syntactic component(s), and a semantic component(s). Preferably, the vectors $\underline{w}$ and $\underline{w}'$ each has a single lexical component, $Q_{lex}(w)$ and $Q_{lex}(w')$, respectively. Preferably, the vectors $\underline{w}$ and $\underline{w}'$ each has a single syntactic component, $Q_{syntax}(w)$ and $Q_{syntax}(w')$, respectively. Preferably, the vectors $\underline{w}$ and $\underline{w}'$ each has a number D of semantic components, $\{Q_{di}(w)\}$ and $\{Q_{di}(w')\}$, respectively, where the i in di is the index into the D semantic components. As will be seen, the number D is about 1700 (more particularly, 1695) in the preferred embodiment of the present invention, but for any single word vector $\underline{w}$ and $\underline{w}'$, most of the D semantic components will be the default value, zero.

2. The Lexical Similarity Portion of WSim

As has been mentioned, in the preferred embodiment of the present invention, the words w and w' may be Chinese words, which are each made up of one or more Chinese characters. Each Chinese character has its own meaning(s). Generally, the meaning(s) of a Chinese word are strongly related to the meaning(s) of the word's component characters. Therefore, if two Chinese words have one or more characters in common, then the two Chinese words are likely to be semantically similar.

If, as described above, an embodiment of the method 901 is conceptualized as creating and combining the vectors $\underline{w}$ and $\underline{w}'$, one possible formulation of the lexical component of each of $\underline{w}$ and $\underline{w}'$ is as follows:

$$Q_{lex}(w) = Q_{lex}(w') = \text{num\_shared\_chars}(w, w')$$

In the above equation, num_shared_chars(w, w') refers to the number of word components (e.g., Chinese characters) that the words w and w' share. Optionally, if num_shared_chars(w, w') is zero, then $Q_{lex}(w)$ is actually instead set to 1.0, and $Q_{lex}(w')$ remains set to zero. $Q_{lex}(w)$ and $Q_{lex}(w')$ may further be multiplied by a weighting constant (not shown in the above equation) that weights lexical similarity relative to the other types of similarity that will be used (e.g., syntactic or semantic similarity) in terms of importance. In the preferred embodiment, the weighting constant for lexical similarity is simply 1.0. Because the vectors $\underline{w}$ and $\underline{w}'$ will eventually be combined using the cosine function, the lexical similarity will be $Q_{lex}(w)$ multiplied by $Q_{lex}(w')$ multiplied by a scaling factor. The scaling factor is supplied by the vector scaling and dot-product multiplication of the cosine computation.

More generally, the lexical similarity of two words w and w' is preferably a function of the number of word components (e.g., Chinese characters) that the words w and w' share. Even more generally, the lexical similarity of any two arbitrary terms is preferably formulated as a function of the number of components (e.g., morphemes) that the two terms share, such that a higher number of shared components typically gives a higher lexical similarity. The lexical similarity additionally is preferably a function of the number of non-shared components, such that given a same shared number of components between two words, a higher number of remaining non-shared components among the two words typically gives a lower lexical similarity.

Alternative formulations of the lexical components of w̱ and w̱' are possible. For example, one alternative formulation is as follows:

$$Q'_{lex}(w) = \text{num\_shared\_chars}(w, w') + \text{word\_id}(w)/\text{tot\_num\_words}$$

$$Q'_{lex}(w') = \text{num\_shared\_chars}(w, w') + \text{word\_id}(w')/\text{tot\_num\_words}$$

In the above alternative formulation, word_id(w) is the internal integer identifier used to represent the word w; word_id(w') is the internal integer identifier used to represent the word w'; and tot_num_words is the total number of words in the vocabulary. The above alternative formulation attempts to take advantage of the fact that, because words in the lexicon are sorted in text-sort order, words that are close together in the lexicon (e.g., whose identifiers differ by a small value) tend to be words that share characters and are semantically similar.

A variation on the above alternative formulation is as follows:

$$Q''_{lex}(w) = Q''_{lex}(w' = \text{num\_shared\_chars}(w, w') + [\text{tot\_num\_words} - |\text{word\_id}(w) - \text{word\_id}(w')|]/\text{tot\_num\_words}$$

Another possible alternative formulation of the lexical components of w̱ and w̱' is as follows:

$$Q'''_{lex}(w) = \text{num\_shared\_chars}(w, w') \cdot (1 + \text{num\_shared\_chars}(w, w')/\text{num\_chars}(w))$$

$$Q'''_{lex}(w') = \text{num\_shared\_chars}(w, w') \cdot (1 + \text{num\_shared\_chars}(w, w')/\text{num\_chars}(w'))$$

In the above alternative formulation, num_chars(x) refers to the number of word components (e.g., Chinese characters) in a word x.

Another possible alternative formulation of the lexical similarity that is the contributed to WSim(w, w') is computed using the conventional sentence-matching system in a manner not to match sentences made up of words but to match words made up of word components (e.g., Chinese characters). Thus, the conventional sentence-matching system is fed, not a database of sentences and each sentence's words, but a database of words and each word's word components. Then, the conventional sentence-matching system can be used to compute lexical similarity between words, and the lexical similarity is combined with the other types of scores in some manner. One possible way to cause the lexical similarity to be combined is as follows:

$$Q''''_{lex}(w) = Q''''_{lex}(w') = \text{sqrt}(TFIDF\_based\_sim(w, w') - \text{lowest\_sim})$$

In the above equation, TFIDF_based_sim( ) is the conventional sentence-matching function, adapted to measure word similarity, and lowest_sim is the lowest achievable value of TFIDF_based_sim( ) for any pair of words in the vocabulary. In another variation, the TFIDF_based_sim( ) is replaced by an IDF_based_sim( ) that differs from the TFIDF_based_sim( ) only in using IDFs instead of using TDIDFs.

3. The Syntactic Similarity Portion of WSim

In Chinese, there exists a close relationship between the syntactic class of a word and its meaning. For example, a (single-character) word that is pronounced "da", when used as a verb, means "beat" (among other meanings). The same word, when used as a quantifier, means "twelve" (i.e., "dozen"). It is for this reason that WSim preferably includes a syntactic similarity component. A word may belong to multiple syntactic classes, for example, "noun" and "verb" part-of-speech (POS) classes.

If, as described earlier, an embodiment of the method 901 is conceptualized as creating and combining the vectors w̱ and w̱', one possible formulation of the lexical component of each of w̱ and w̱' is as follows:

$$Q_{syn}(w) = \text{num\_shared\_POS}(w, w') \cdot (1 + 1/\text{num\_POS}(w)) \cdot C_{syn}$$

$$Q_{syn}(w') = \text{num\_shared\_POS}(w, w') \cdot (1 + 1/\text{num\_POS}(w')) \cdot C_{syn}$$

In the above equations, number_shared_POS(w, w') refers to the number of POS classes to which both words w and w' belong; num_POS(x) refers to the number of POS classes to which a word x belongs; and $C_{syn}$ refers to a weighting constant that weights syntactic similarity relative to the other types of similarity that will be used (e.g., lexical or semantic similarity) in terms of importance. In the currently-preferred embodiment, $C_{syn}$ is set to a value of one fourth (¼). Because the vectors w̱ and w̱' will eventually be combined using the cosine function, the syntactic similarity will be $Q_{syn}(w)$ multiplied by $Q_{syn}(w')$ multiplied by a scaling factor. The scaling factor is supplied by the vector scaling and dot-product multiplication of the cosine computation. The rationale behind the relatively low weighting (¼ squared) of the syntactic similarity according to the preferred embodiment is that the syntactic similarity is the weakest indicator of semantic similarity, among the three types of similarities used (lexical, semantic, and syntactic).

More generally, the syntactic similarity of two words w and w' is preferably a function of the number of syntactic classes to which both words belong, such that a higher number of shared syntactic classes typically gives a higher syntactic similarity. Examples of syntactic classes include POS classes, for example, a "noun" class, a "verb" class, and so forth.

4. The Semantic Similarity Portion of WSim a. A Classification System (e.g., Class/Subclass) for Word Meanings As has been mentioned, every word has one or more definitions. Preferably, a classification system exists such that each definition of each word belongs to at least one meaning class (which is also called definition class in the present document). Preferably, the classification is a partitioning of the set of all definitions of all words, so that each definition of each word belongs to exactly one class.

For the Chinese language, there exists a semantic classification system. According to this classification system, each word within the system may be defined by one or more definition classes from among many pre-established definition classes. Each class is referred to as a definition root. Even beyond classifying all Chinese word definitions (for the more than about 50,000 words of the existing semantic classification system), the existing semantic classification system further specifies each word as being related to each of its definition root(s) according to one of about fifteen relationships. In addition to these relationships, an "isUnknown" relationship is used in the present invention as an initial null value. The relationships used in the present invention are: (1) isUnknown, (2) isSuperordinate, (3) isCorelation, (4) isPartof, (5) isTreatment, (6) isCanbeused, (7) isHidden, (8) isPointto, (9) isPerhaps, (10) isTimeorSpace, (11) isMaterial, (12) isNessasary, (13) isWordtable, (14) isNotexist, (15) isSensitive, and (16) isCommon. In short, each word belongs to some definition class(es) and also belongs to a subclass within each of the word's class(es). The existing semantic classification system may be extended, to cover new words added to a vocabulary, by manually assigning classes (e.g., definition roots) and subclasses (e.g., relationships) to new words and creating new classes (definition roots) as necessary. In the preferred embodiment of the present invention, there are at least about 1700 (e.g., 1695) definition classes (definition roots), and about 15 (e.g., 16) subclasses within the definition classes.

a. The Semantic Similarity is Based on the Classification System

If, as described earlier, an embodiment of the method 901 is conceptualized as creating and combining the word vectors $\underline{w}$ and $\underline{w}'$, one possible formulation of the semantic components of $\underline{w}$ and $\underline{w}'$ is as follows:

for each definition class di, from i=1 to D (e.g., D equals about 1700)
{

$$Q_{di}(w)=0$$

$$Q_{di}(w')=0$$

} for each definition class di to which the word w belongs

{

$$Q_{di}(w) = \lambda(ei) \cdot \frac{1/\text{num\_member\_words}(di)}{\sum_{w \in dj} 1/\text{num\_member\_words}(dj)}$$

(where $ei$ is the subclass of the word $w$ within the class $di$)

} for each definition class di to which the word w' belongs

{

$$Q_{di}(w') = \lambda(ei') \cdot \frac{1/\text{num\_member\_words}(di)}{\sum_{w \in dj} 1/\text{num\_member\_words}(dj)}$$

(where $ei'$ is the subclass of the word $w'$ within the class $di'$)

}

In the above equations, $\ddot{e}(x)$ refers to a weight that is associated with the particular subclass x, and num_member_words(y) refers to the number of words that have at least one definition that belongs to the definition class y. The subclass weights, $\ddot{e}( )$, give a judgment of the tightness between a word's definition and that definition's definition root. For example, a relationship of "isSuperordinate" is tighter than a relationship of "isPartof", and therefore the weight $\ddot{e}$(isSuperordinate) is greater than the weight $\ddot{e}$(isPartof). The remainder of each equation gives a judgment of the relative importance, for discriminating meanings, of the particular definition class di. (In the previous sentence, "the remainder of each equation", of course, refers to the inverse class word membership size, 1/num_member_words( ), of the class di, divided by the sum of the inverse class word membership sizes of all classes.)

Because the vectors $\underline{w}$ and $\underline{w}'$ will eventually be combined using the cosine function, the semantic similarity will be the dot product of the subvectors, $\{Q_{di}(w)\}$ and $\{Q_{di}(w')\}$, multiplied by a scaling factor. The scaling factor is supplied by the vector scaling and dot-product multiplication of the cosine computation. The dot product will include nonzero product terms only from vector dimensions di in which both $Q_{di}(w)$ and $Q_{di}(w')$ are nonzero—i.e., from definition classes shared by a definition from word w and a definition from word w'. The vector components, $Q_{di}(w)$ and $Q_{di}(w')$, of the other (i.e., non-shared) vector dimensions do have an effect on the semantic similarity; they influence the scaling factor via the vector scaling. For example, suppose two words, w and w', each has a definition, def1 and def1', respectively. Suppose that the definitions def1 and def1' belong to a common definition class. Then, assuming nonzero $\ddot{e}( )$, the semantic similarity between word w and w' will be nonzero. Suppose further that the word w' has only the single def2' definition. Then, if the word w has only the def1 definition, the semantic similarity between words w and w' will have a certain value, value1. Alternatively, if the word w also has a def2 definition that does not belong to the same definition class as def1', then, still assuming nonzero $\ddot{e}( )$, the semantic similarity between words w and w' will be lower than value1. In the alternative case, the def1 definition is only one of two (differently classed) definitions within the word w, and therefore the def1 definition is less important to the word w in the alternative case than in the original case. In short, the formulation of the semantic similarity reflects within-word importance of definitions.

More generally, the semantic similarity of two words w and w' is preferably a function of the definition classes in common between the words w and w'. The semantic similarity of two words w and w' additionally preferably reflects the relative importance of definition classes (e.g., for a vocabulary), and preferably also the relative importance of definition subclasses (e.g., for a vocabulary). The semantic similarity of two words w and w' additionally preferably reflects the within-word importance of the definition classes in common between the words w and w'.

In the preferred embodiment of the present invention, the definition subclass weights are as follows: $\ddot{e}$(isUnknown)=0; $\ddot{e}$(isSuperordinate)=3; $\ddot{e}$(isCorelation)=3; $\ddot{e}$(isPartof)=3; $\ddot{e}$(isTreatment)=1; $\ddot{e}$(isCanbeused)=2; $\ddot{e}$(isHidden)=2; $\ddot{e}$(isPointto)=1; $\ddot{e}$(isPerhaps)=1; $\ddot{e}$(isTimeorSpace)=1; $\ddot{e}$(isMaterial)=2; $\ddot{e}$(isNessasary)=2; $\ddot{e}$(isWordtable)=2; $\ddot{e}$(isNotexist)=2; $\ddot{e}$(isSensitive)=2; and $\ddot{e}$(isCommon)=1.

5. Combining the Portions of WSim

As has been mentioned, the lexical similarity, the syntactic similarity, and the semantic similarity are combined to form WSim. (Of course, it should be clear that WSim is itself a measurement of semantic similarity.) In combining the three types of similarities (or of any two of them, in alternative embodiments), different weightings may be used.

If, as described earlier, an embodiment of the method 901 is conceptualized as creating the word vectors $\underline{w}$ and $\underline{w}'$ and combining them, then the word vectors $\underline{w}$ and $\underline{w}'$ are as follows:

$$\underline{w}=(Q_{lex}(w), Q_{syn}(w), Q_{d1}(w), \ldots, Q_{dD}(w))$$

$$\underline{w}'=(Q_{lex}(w'), Q_{syn}(w'), Q_{d1}(w'), \ldots, Q_{dD}(w'))$$

The unit vectors $\underline{w}^*$ and $\underline{w}^*$ are as follows:

$$\underline{w}^*=(Q^*_{lex}(w), Q^*_{syn}(w), Q^*_{d1}(w), \ldots, Q^*_{dD}(w))$$

$$\underline{w}'^*=(Q^*_{lex}(w'), Q^*_{syn}(w'), Q^*_{d1}(w'), \ldots, Q^*_{dD}(w'))$$

where:

$$Q_x^* = \frac{Q_x}{\|w\|} = \frac{Q_x}{\sum_{y=lex,syn,dl,\ldots,dD} Q_y}$$

$$Q'^* = \frac{Q'}{\|w'\|}$$

Finally, WSim, the full semantic similarity between words w and w' is as follows:

$$WSim(w, w') = \text{cosine}(\underline{w}, \underline{w'}) = \underline{w^*} \cdot \underline{w'^*} = \sum_{y=lex,syn,dl,\ldots,dD} Q_y^* \cdot Q_y'^*$$

VIII. Further Comments

Appended herewith as an Appendix A is an example providing further description of computation of lexical similarity according to an embodiment of the present invention. Appended herewith as an Appendix B is an example providing further description of computation of syntactic similarity according to an embodiment of the present invention.

While the invention is described in some detail with specific reference to a single preferred embodiment and certain alternatives, there is no intent to limit the invention to that particular embodiment or those specific alternatives. For example, the present invention is applicable not only to Chinese sentences, or to sentences of mixed languages including Chinese, but instead is applicable to sentences of other languages or sentences of mixed languages that do not include Chinese. Thus, the true scope of the present invention is not limited to any one of the foregoing exemplary embodiments but is instead defined by the appended claims.

What is claimed is:

1. A method for determining a similarity between a first word and a second word, the method comprising:
   based on at least one definition of the first word, associating the first word with: at least one definition class and at least one corresponding definition weight,
   based on at least one definition of the second word, associating the second word with: at least one definition class and at least one corresponding definition weight,
   identifying common definition classes, the common definition classes including one or more of the at least one definition class associated with both the first and second words, and
   determining the similarity based on the definition weights corresponding to:
      the first word and the common definition classes, and
      the second word and the common definition classes.

2. The method of claim 1, further comprising:
   determining a first number representing one or more of the at least one definition class associated with the first word, and a second number representing one or more of the at least one definition class associated with the second word, and
   wherein determining the similarity includes determining the similarity based on the first number and the second number.

3. The method of claim 1, further comprising:
   associating the first word with at least one speech class based on at least one part of speech of the first word, and
   associating the second word with at least one speech class based on at least one part of speech of the second word, and
   wherein determining includes:
      determining the similarity based on the at least one speech class associated with the first word and the at least one speech class associated with the second word.

4. The method of claim 3, wherein the at least one part of speech includes at least one of an adjective, an adverb, a conjunction, a noun, a preposition, a pronoun, and a verb.

5. The method of claim 3, wherein determining the similarity includes:
   determining a first number representing one or more of the at least one speech class associated with the first word, a second number representing one or more of the at least one speech class associated with the second word, and a third number representing zero or more of the at least one speech class associated with both the first and second words, and
   determining the similarity based on the first number, the second number, and the third number.

6. The method of claim 1, wherein determining the similarity includes:
   determining a number representing zero or more common characters included in both the first and second words, and
   determining the similarity based on the number of common characters.

7. The method of claim 1, wherein determining the similarity includes:
   determining a first number representing one or more characters included in the first word, a second number representing one or more characters included in the second number, and a third number representing zero or more common characters included in both the first and second words, and
   determining the similarity based on the first number, the second number, and the third number.

8. The method of claim 6, wherein the characters include characters of at least one ideographic language.

9. The method of claim 6, wherein the characters include characters of at least one of Chinese and Japanese.

10. The method of claim 1, wherein each of the definition weights is based on at least one of: a type and a degree of relationship between a word and a definition class.

11. A method for determining a similarity between a first word and a second word, the method comprising:
   based on at least one definition of the first word, associating the first word with: at least one definition class and at least one corresponding definition weight,
   based on at least one definition of the second word, associating the second word with: at least one definition class and at least one corresponding definition weight,
   identifying common definition classes, the common definition classes including one or more of the at least one definition class associated with both the first and second words, and
   determining the similarity based on the definition weights corresponding to:
      the first word and the common definition classes,
      the second word and the common definition classes, and
      a number representing zero or more common characters included in both the first and second words.

12. The method of claim 11, wherein determining the similarity includes:
   determining the similarity based on a first number representing one or more characters included in the first word, and a second number representing one or more characters included in the second word.

13. The method of claim 11, wherein the characters include characters of at least one ideographic language.

14. The method of claim 11, wherein the characters include characters of at least one of Chinese and Japanese.

15. The method of claim 11, wherein determining includes:
 determining a first number representing one or more of the at least one definition class associated with the first word, and a second number representing one or more of the at least one definition class associated with the second word, and
 wherein determining the similarity includes determining the similarity based on the first number and the second number.

16. The method of claim 11, wherein each of the definition weights is based on at least one of: a type and a degree of relationship between a word and a definition class.

17. A method for determining a similarity between a first set of at least one first word and a second set of at least one second word, the method comprising:
 determining word-word similarities between one of the at least one first word and one of the at least one second word, the word-word similarities based on a semantic similarity between the one of the at least one first word and the one of the at least one second word, the semantic similarity between the one of the at least one first word and the one of the at least one second word based on definition weights corresponding to:
  the one of the at least one first word and common definition classes, and
  the one of the at least one second word and common definition classes, in which the one of the at least one first word is associated with at least one definition class and at least one corresponding definition weight based on at least one definition of the one of the at least one first word, the one of the at least one second word is associated with at least one definition class and at least one corresponding definition weight based on at least one definition of the one of the at least one second word, and the common definition classes include one or more of the at least one definition class associated with both the one of the at least one first word and the one of the at least one second word, and
 determining the similarity between the first set and the second set based on the word-word similarities between each of the at least one first word and each of the at least one second word.

18. The method of claim 17, wherein determining the word-word similarities includes:
 accessing pre-determined word-word similarities.

19. The method of claim 17, wherein determining the word-word similarities further includes:
 determining the word-word similarities based on a lexical similarity between the one of the at least one first word and the one of the at least one second word, and
 wherein the lexical similarity between the one of the at least one first word and the one of the at least one second word is based on a number representing zero or more common characters included in both the one of the at least one first word and the one of the at least one second word.

20. The method of claim 19, wherein the characters are characters of at least one of Chinese and Japanese.

21. The method of claim 17, wherein determining the word-word similarities farther includes:
 determining the word-word similarities based on a syntactic similarity between each of the at least one first word and each of the at least one second word, and
 wherein the syntactic similarity between one of the at least one first word and one of the at least one second word is based on:
  at least one speech class associated with the one of the at least one first word based on at least one part of speech of the one of the at least one first word, and
  at least one speech class associated with the one of the at least one second word based on at least one part of speech of the one of the at least one second word.

22. The method of claim 21, wherein the syntactic similarity between the one of the at least one first word and the one of the at least one second word is based on a number representing zero or more of the at least one speech class associated with both the one of the at least one first word and the one of the at least one second word.

23. The method of claim 17, wherein determining the similarity includes:
 for each word of the at least one first word, determining one of the at least one second word having the greatest word-word similarity for the each word of the at least one first word, and
 based on the greatest word-word similarity for each word of the at least one first word, determining the similarity between the first set and the second set.

24. The method of claim 17, wherein each of the definition weights is based on at least one of: a type and a degree of relationship between a word and a definition class.

25. A method for searching a database, the method comprising:
 receiving search data including a first set of at least one first word from a client,
 associating data in the database with at least one second set of at least one second word,
 for each of the at least one second set, determining word-word similarities between each of the at least one first word and each of the at least one second word, the word-word similarities based on a semantic similarity between each of the at least one first word and each of the at least one second word, the semantic similarity between one of the at least one first word and one of the at least one second word based on definition weights corresponding to:
  the one of the at least one first word and common definition classes, and
  the one of the at least one second word and common definition classes, in which the one of the at least one first word is associated with at least one definition class and at least one corresponding definition weight based on at least one definition of the one of the at least one first word, the one of the at least one second word is associated with at least one definition class and at least one corresponding definition weight based on at least one definition of the one of the at least one second word, and the common definition classes include one or more of the at least one definition class associated with both the one of the at least one first word and the one of the at least one second word, and
 for each of the at least one second set, based on the word-word similarities between each of the at least one first word and each of the at least one second word, determining set-set similarities between the first set and the at least one second set, and based on the set-set similarities between the first set and the at least one second set, providing data associated with one of the at least one second set from the database to the client.

26. The method of claim 25, wherein determining the word-word similarities includes:

accessing predetermined word-word similarities.

27. The method of claim 25, wherein determining the word-word similarities further includes:

determining the word-word similarities based on a lexical similarity between one of the at least one first word and one of the at least one second word, and wherein the lexical similarity between the one of the at least one first word and the one of the at least one second word is based on a number representing zero or more common characters included in both the one of the at least one first word and the one of the at least one second word.

28. The method of claim 27, wherein the characters arm characters of at least one of Chinese and Japanese.

29. The method of claim 25, wherein determining the word-word similarities further includes:

determining the word-word similarities based on a syntactic similarity between each of the at least one first word and each of the at least one second word, and wherein the syntactic similarity between one of the at least one first word and one of the at least one second word is based on:

at least one speech class associated with the one of the at least one first word based on at least one part of speech of the one of the at least one first word, and at least one speech class associated with the one of the at least one second word based on at least one part of speech of the one of the at least one second word.

30. The method of claim 29, wherein the syntactic similarity between the one of the at least one first word and the one of the at least one second word is based on a number representing zero or more of the at least one speech class associated with both the one of the at least one first word and the one of the at least one second word.

31. The method of claim 25, wherein determining the set-set similarities includes:

for each word of the at least one first word, for each of the at least one second set, determining one of the at least one second word having the greatest word-word similarity for the each word of the at least one first word, and for each of the at least one second set, based on the greatest word-word similarity for each word of the at least one first word, determining the set-set similarity between the first set and each of the at least one second set.

32. The method of claim 25, wherein providing includes:

providing data associated with the second set having the greatest set-set similarity for the fist set from the database to the client.

33. The method of claim 25, wherein each of the definition weights is based on at least one of: a type and a degree of relationship between a word and a definition class.

* * * * *